US012808423B2

(12) United States Patent
Montagna et al.

(10) Patent No.: US 12,808,423 B2
(45) Date of Patent: Nov. 24, 2026

(54) FULCRUM AND CHECK DISCS FOR SHOCK ABSORBER WITH OPTIMIZED BLEED RANGE AND TUNEABILITY

(71) Applicant: Advanced Suspension Technology LLC, Northville, MI (US)

(72) Inventors: Franky Montagna, Bilzen (BE); Werner Bosmans, Koersel (BE)

(73) Assignee: Advanced Suspension Technology LLC, Northville, MI (US)

(*) Notice: Subject to any disclaimer, the term of this patent is extended or adjusted under 35 U.S.C. 154(b) by 700 days.

(21) Appl. No.: 18/313,509

(22) Filed: May 8, 2023

(65) Prior Publication Data

US 2024/0376953 A1 Nov. 14, 2024

(51) Int. Cl.

| | |
|---|---|
| ***F16F 9/34*** | (2006.01) |
| ***B60G 13/08*** | (2006.01) |
| ***F16F 9/19*** | (2006.01) |
| ***F16F 9/348*** | (2006.01) |

(52) U.S. Cl.

CPC ........ *F16F 9/3484* (2013.01); *F16F 2222/12* (2013.01); *F16F 2228/066* (2013.01); *F16F 2232/08* (2013.01)

(58) Field of Classification Search

CPC ................. F16F 9/3484; F16F 2222/12; F16F 2228/066; F16F 2232/08; F16F 9/3487

See application file for complete search history.

(56) References Cited

U.S. PATENT DOCUMENTS

| | | | | |
|---|---|---|---|---|
| 4,615,420 A | | 10/1986 | Mourray | |
| 4,624,347 A | | 11/1986 | Mourray | |
| 4,830,152 A | | 5/1989 | Rauert et al. | |
| 4,905,799 A | * | 3/1990 | Yamaoka | F16F 9/348 188/322.22 |
| 5,316,113 A | * | 5/1994 | Yamaoka | F16F 9/3484 188/320 |
| 5,529,154 A | | 6/1996 | Tanaka | |
| 5,738,190 A | | 4/1998 | Deferme | |

(Continued)

FOREIGN PATENT DOCUMENTS

| | | |
|---|---|---|
| CN | 112360913 B | 4/2022 |
| CN | 113417960 B | 5/2022 |

(Continued)

*Primary Examiner* — Robert A. Siconolfi
*Assistant Examiner* — James K Hsiao
(74) *Attorney, Agent, or Firm* — Harness, Dickey & Pierce, P.L.C.

(57) ABSTRACT

A shock absorber for a vehicle including a pressure tube defining a fluid chamber, a piston disposed within the fluid chamber and including a fluid passage, and a valve assembly. The valve assembly includes a restriction disc, an orifice disc, a fulcrum disc, and a check disc. The restriction disc includes a first ring, a first finger, and a first orifice. The first finger covers the fluid passage. The orifice disc includes a second ring, a second finger, and a second orifice. The second finger overlaps the first finger, and the second orifice is aligned with the first orifice. The check disc includes a third ring and a third finger above the second finger. The fulcrum disc has a fourth ring. Modifying the outer diameter of the third ring and the outer diameter of the fourth ring alters a damping response of the shock absorber.

15 Claims, 15 Drawing Sheets

(56) References Cited

U.S. PATENT DOCUMENTS

| | | | | |
|---|---|---|---|---|
| 6,318,739 | B1 * | 11/2001 | Fehn, Jr. | A63C 17/0046 280/11.225 |
| 6,672,436 | B1 | 1/2004 | Keil et al. | |
| 7,694,786 | B2 | 4/2010 | Asadi et al. | |
| 7,703,586 | B2 | 4/2010 | Deferme | |
| 8,069,964 | B2 * | 12/2011 | Deferme | F16F 9/3481 188/322.22 |
| 9,067,471 | B2 | 6/2015 | Tuts et al. | |
| 9,249,854 | B2 * | 2/2016 | Kim | F16F 9/348 |
| 9,297,436 | B2 | 3/2016 | Morita | |
| 9,334,919 | B2 | 5/2016 | Flacht et al. | |
| 9,347,512 | B2 * | 5/2016 | Yamada | F16F 9/3484 |
| 9,410,595 | B2 * | 8/2016 | Yamada | F16F 9/3481 |
| 9,441,699 | B2 * | 9/2016 | Lawler | F16F 9/3484 |
| 9,500,251 | B2 * | 11/2016 | Rummel | F16F 9/18 |
| 9,587,703 | B2 | 3/2017 | Rummel | |
| 9,777,790 | B2 | 10/2017 | Mizuno et al. | |
| 10,233,995 | B2 | 3/2019 | Kim | |
| 10,258,146 | B2 * | 4/2019 | Hansen | F16F 9/19 |
| 10,451,138 | B2 * | 10/2019 | Kuroiwa | F16F 9/348 |
| 10,526,014 | B2 | 1/2020 | Hamers et al. | |
| 10,544,852 | B2 * | 1/2020 | Inagaki | F16F 9/446 |
| 10,995,813 | B2 * | 5/2021 | Yamashita | F16F 9/34 |
| 11,441,633 | B2 * | 9/2022 | Deferme | F16F 9/369 |
| 11,698,120 | B2 * | 7/2023 | Montagna | F16F 9/3487 188/313 |
| 11,719,304 | B2 * | 8/2023 | Montagna | F16F 9/3488 188/266 |
| 11,808,323 | B2 * | 11/2023 | Montagna | F16F 9/185 |
| 12,098,756 | B2 * | 9/2024 | Montagna | F16F 9/3488 |
| 12,320,404 | B2 * | 6/2025 | Montagna | F16F 9/3487 |
| 2005/0056505 | A1 * | 3/2005 | Deferme | F16F 9/3485 188/283 |
| 2005/0279597 | A1 * | 12/2005 | Yamaguchi | F16F 9/348 188/322.13 |
| 2006/0283676 | A1 * | 12/2006 | Deferme | F16F 9/3485 188/322.15 |
| 2007/0034466 | A1 * | 2/2007 | Paesmans | F16F 9/3405 188/322.22 |
| 2008/0314704 | A1 | 12/2008 | Deferme | |
| 2013/0112517 | A1 | 5/2013 | Henige et al. | |
| 2013/0234378 | A1 * | 9/2013 | Ericksen | B60G 13/06 267/221 |
| 2014/0150897 | A1 * | 6/2014 | Ashiba | F16F 9/3485 137/343 |
| 2014/0231199 | A1 * | 8/2014 | Kim | F16F 9/34 188/313 |
| 2014/0262655 | A1 * | 9/2014 | Tuts | B60G 13/08 188/322.15 |
| 2014/0332332 | A1 * | 11/2014 | Lawler | F16F 9/3484 188/313 |
| 2015/0041269 | A1 * | 2/2015 | Lim | F16F 9/3485 188/322.15 |
| 2015/0114774 | A1 * | 4/2015 | Kim | F16F 9/3485 188/322.15 |
| 2015/0192184 | A1 * | 7/2015 | Yamada | F16F 9/3481 188/322.15 |
| 2015/0204408 | A1 | 7/2015 | Morita | |
| 2015/0323037 | A1 * | 11/2015 | De Kock | F16F 9/341 188/313 |
| 2015/0337918 | A1 * | 11/2015 | Rummel | B60G 13/08 188/315 |
| 2016/0068373 | A1 * | 3/2016 | Chin | B63B 23/28 212/253 |
| 2016/0146286 | A1 * | 5/2016 | Rummel | F16F 9/3484 188/313 |
| 2016/0201752 | A1 * | 7/2016 | Kim | F16F 9/3415 188/280 |
| 2016/0258504 | A1 * | 9/2016 | Mizuno | F16F 9/3484 |
| 2016/0356335 | A1 * | 12/2016 | Nomura | F16F 9/3485 |
| 2017/0211652 | A1 | 7/2017 | Kuroiwa | |
| 2017/0241502 | A1 * | 8/2017 | Rummel | F16F 9/348 |
| 2017/0268593 | A1 | 9/2017 | Kim | |
| 2018/0202507 | A1 | 7/2018 | Kim | |
| 2018/0340589 | A1 * | 11/2018 | Cheong | F16F 9/3485 |
| 2020/0208707 | A1 | 7/2020 | Nakano et al. | |
| 2020/0400208 | A1 | 12/2020 | Ishimaru et al. | |
| 2021/0025471 | A1 | 1/2021 | Kobayashi et al. | |
| 2021/0301897 | A1 * | 9/2021 | Montagna | F16F 9/3487 |
| 2021/0301898 | A1 * | 9/2021 | Montagna | F16F 9/3235 |
| 2022/0196106 | A1 * | 6/2022 | Wimmer | F16F 9/369 |
| 2022/0260129 | A1 | 8/2022 | Montagna | |
| 2022/0379677 | A1 * | 12/2022 | Lusso | B60G 17/0272 |
| 2023/0019332 | A1 | 1/2023 | Montagna et al. | |
| 2023/0400081 | A1 | 12/2023 | Montagna | |

FOREIGN PATENT DOCUMENTS

| | | | |
|---|---|---|---|
| CN | 115398120 | A | 11/2022 |
| DE | 19712895 | C2 | 6/2001 |
| EP | 1148268 | A2 | 10/2001 |
| EP | 4127506 | A1 | 2/2023 |
| EP | 4127507 | A1 | 2/2023 |
| EP | 4127508 | A1 | 2/2023 |
| JP | H08014306 | A | 1/1996 |
| JP | H11336825 | A | 12/1999 |
| JP | 2006194335 | A | 7/2006 |
| JP | 4426718 | B2 | 3/2010 |
| JP | 4726039 | B2 | 7/2011 |
| JP | 5220560 | B2 | 6/2013 |
| WO | WO-2021195535 | A1 | 9/2021 |
| WO | WO-2021195550 | A1 | 9/2021 |
| WO | WO-2021195554 | A1 | 9/2021 |
| WO | WO-2022168817 | A1 | 8/2022 |
| WO | WO-2022173897 | A1 | 8/2022 |
| WO | 2025069838 | A1 | 4/2025 |
| WO | 2025069877 | A1 | 4/2025 |

* cited by examiner

FULCRUM AND CHECK DISCS FOR SHOCK ABSORBER WITH OPTIMIZED BLEED RANGE AND TUNEABILITY

FIELD

The present disclosure relates to automotive shock absorbers/dampers. More particularly, the present disclosure relates to components of shock absorbers/dampers that provide optimized bleed range and tunability.

BACKGROUND

The statements in this section merely provide background information related to the present disclosure and may not constitute prior art.

Shock absorbers are typically used in conjunction with automotive suspension systems or other suspension systems to absorb unwanted vibrations that occur during movement of the suspension system. In order to absorb these unwanted vibrations, automotive shock absorbers are generally connected between the sprung (body) and the unsprung (suspension/drivetrain) masses of the vehicle.

The most common type of shock absorbers for automobiles are mono-tube and dual-tube shock absorbers. In the mono-tube shock absorber, a piston is located within a fluid chamber defined by a pressure tube and is connected to the sprung mass of the vehicle through a piston rod. The pressure tube is connected to the unsprung mass of the vehicle. The piston divides the fluid chamber of the pressure tube into a first working chamber and a second working chamber. The piston includes compression valving that limits the flow of hydraulic fluid from the second working chamber to the first working chamber during a compression stroke. The piston also includes rebound valving that limits the flow of hydraulic fluid from the first working chamber to the second working chamber during a rebound or extension stroke. Because the compression valving and the rebound valving have the ability to limit the flow of hydraulic fluid, the shock absorber is able to produce a damping force that counteracts oscillations/vibrations, which would otherwise be transmitted from the unsprung mass to the sprung mass.

Together, the compression and rebound valving assemblies for the shock absorber have the function of controlling fluid flow between the upper and second working chambers of the shock absorber. By controlling the fluid flow between the two working chambers, a pressure drop is built up between the two working chambers and this contributes to the damping forces of the shock absorber. The compression and rebound valving and the check valve assemblies can be used to tune the damping forces to control ride and handling as well as noise, vibration, and harshness.

While there are various features and elements to tune a shock absorber, a need exists for improved tunability and repeatability of shock absorbers.

SUMMARY

This section provides a general summary of the disclosure, and is not a comprehensive disclosure of its full scope or all of its features.

In accordance with one aspect of the subject disclosure, a shock absorber for a vehicle is provided. The shock absorber includes a pressure tube defining a fluid chamber, a piston disposed within the fluid chamber and including a fluid passage, and a valve assembly. The valve assembly includes a restriction disc, an orifice disc, a fulcrum disc, and a check disc. The restriction disc includes a first ring, a first finger extending from the first ring, and a first orifice extending through the first finger. The first finger covers the fluid passage of the piston. The orifice disc includes a second ring, a second finger extending from the second ring, and a second orifice extending through the second finger. The second finger overlaps the first finger, and the second orifice is aligned with the first orifice. The check disc includes a third ring and a third finger extending from the third ring, wherein the third finger is above the second finger. The fulcrum disc has a fourth ring. Modifying the outer diameter of the third ring and the outer diameter of the fourth ring alters a damping response of the shock absorber. For example, the outer diameters of the fulcrum disc and the check disc may be adjusted to tune the closing moment of the check disc and the transition from open bleed to normal bleed.

One aspect of the subject disclosure is directed to a method for controlling the flow of hydraulic between an upper working chamber and a lower working chamber of a pressure tube through a piston disposed within the pressure tube, the piston having one or more flow passages. The method includes providing a fulcrum disc proximate to the piston, the fulcrum disc having a first ring with a first center hole, a first inner diameter, and a first outer diameter, providing a check disc proximate to the fulcrum disc opposite the piston, the check disc having a second ring with a second center hole, a second inner diameter, a second outer diameter, and one or more radial extensions from the second ring, and selecting the first outer diameter and the second outer diameter based on a desired damping response.

In accordance with one aspect of the subject disclosure, a kit for a shock absorber for a vehicle is provided. The kit includes a pressure tube defining a fluid chamber, a piston configured to be disposed within the fluid chamber, a first fulcrum disc, a first check disc, a second fulcrum disc, and a second check disc. The piston divides the fluid chamber into an upper working chamber and a lower working chamber, wherein the piston defines a pair of bleed passages and a blow off passage that extend through the piston between the upper working chamber and the lower working chamber. The first fulcrum disc has a ring, a first fulcrum disc inner diameter, and a first fulcrum disc outer diameter. The first check disc has a ring, a first check disc inner diameter, a first check disc outer diameter, and one or more first radial extensions. The second fulcrum disc has a ring, a second fulcrum disc inner diameter, and a second fulcrum disc outer diameter, wherein the second fulcrum disc outer diameter is different from the first fulcrum disc outer diameter. The second check disc has a ring, a second check disc inner diameter, a second check disc outer diameter, wherein the second check disc outer diameter is different from the first check disc outer diameter, and one or more second radial extensions. Only one of the first fulcrum disc and the second fulcrum disc and only one of the first check disc and the second check disc is included in the shock absorber based on a desired damping response.

In accordance with another aspect of the subject disclosure, a shock absorber for a vehicle is provided. The shock absorber includes a pressure tube defining a fluid chamber, a piston disposed within the fluid chamber, and a valve assembly. The piston divides the fluid chamber into an upper working chamber and a lower working chamber, wherein the piston comprises a first side, a second side, and a fluid passage that extends through the piston between the upper working chamber and the lower working chamber. The valve assembly includes a restriction disc proximate to the first side of the piston, an orifice disc, wherein the restriction disc is between the orifice disc and the first side of the piston, a check disc, and a fulcrum disc, wherein the fulcrum disc is between the orifice disc and the check disc. The restriction disc includes a first ring, and a first finger extending radially outward from the first ring, the first finger configured to cover the fluid passage, the first finger having a first bleed orifice, wherein the first bleed orifice remains open regardless of position of the restriction disc. The orifice disc including a second ring, and a second finger extending radially outward from the second ring, having a second bleed orifice, wherein the second bleed orifice remains open regardless of position of the orifice disc, wherein the second finger of the orifice disc overlaps the first finger of the restriction disc, and wherein the second bleed orifice is aligned with the first bleed orifice. The check disc includes a third ring and a third finger extending radially outward from the third ring, the third finger of the check disc is above the second finger of the orifice disc. The fulcrum disc includes a fourth ring.

Further areas of applicability and advantages will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
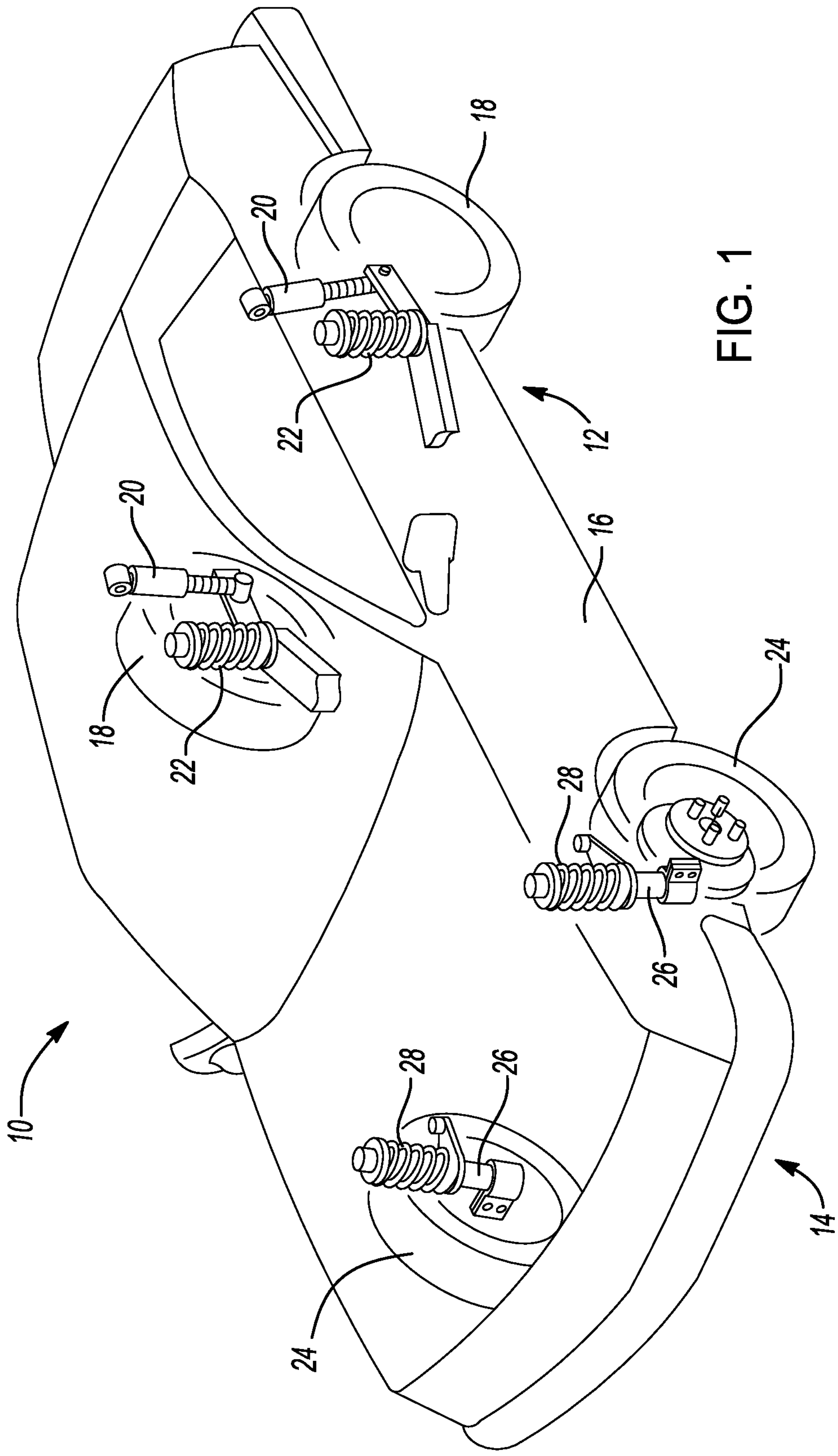
FIG. 1 is an illustration of an exemplary vehicle equipped with a shock absorber in accordance with the teachings of the present disclosure.

The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIG. 1, a vehicle 10 including a rear suspension 12, a front suspension 14, and a body 16 is illustrated. The rear suspension 12 has a rear axle assembly (not shown) adapted to operatively support the vehicle's rear wheels 18. The rear axle assembly is operatively connected to the body 16 by a pair of shock absorbers 20 and a pair of helical coil springs 22. Similarly, the front suspension 14 includes a front axle assembly (not shown) to operatively support the vehicle's front wheels 24. The front axle assembly is operatively connected to the body 16 by a second pair of shock absorbers 26 and by a pair of helical coil springs 28. The shock absorbers 20 and 26 serve to dampen the relative motion of the unsprung portion (i.e., the front and rear suspensions 14 and 12, respectively) and the sprung portion (i.e., the body 16) of the vehicle 10. While the vehicle 10 has been depicted as a passenger car having front and rear axle assemblies, the shock absorbers 20 and 26 may be used with other types of vehicles or machinery, or in other types of applications such as vehicles incorporating independent front and/or independent rear suspension systems. Further, the term "shock absorber" as used herein is meant to refer to shock absorber and shock absorber systems in general and thus will include MacPherson struts. It should also be appreciated that the scope of the subject disclosure is intended to include shock absorber systems for stand-alone shock absorbers 20 and coil-over shock absorbers 26.

Figure 2:
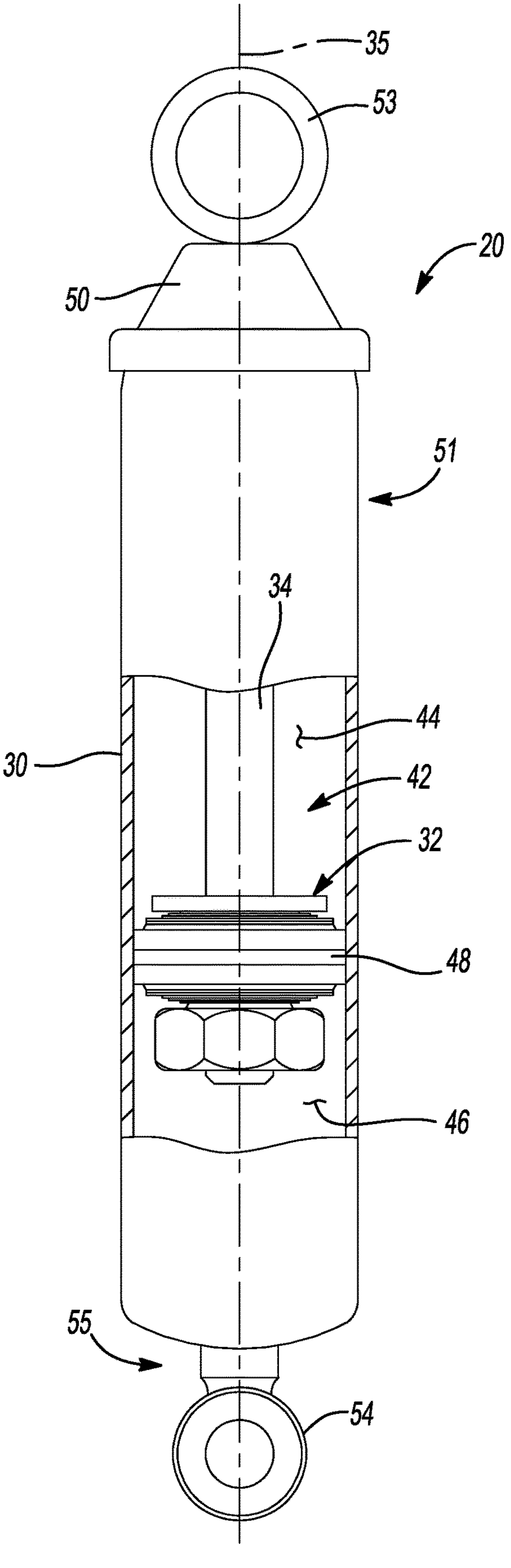
FIG. 2 is a fragmentary side view of a shock absorber constructed in accordance with the teachings of the present disclosure.

With additional reference to FIG. 2, the shock absorber 20 is shown in greater detail. While FIG. 2 shows only the shock absorber 20, it is to be understood that the shock absorber 26 also includes the piston assembly described below for the shock absorber 20. The shock absorber 26 only differs from the shock absorber 20 in the way in which it is adapted to be connected to the sprung and unsprung portions of the vehicle 10 and the mounting location of the coil spring 28 relative to the shock absorber 26.

The shock absorber 20 comprises a pressure tube 30, a piston assembly 32, and a piston rod 34. The pressure tube 30 and the piston rod 34 extend co-axially along a longitudinal axis 35. The pressure tube 30 defines an internal cavity 42. The piston assembly 32 is slidably disposed within the internal cavity 42 of the pressure tube 30 and divides the internal cavity 42 into a first working chamber 44 and a second working chamber 46. A seal 48 is disposed between the piston assembly 32 and the pressure tube 30 to permit sliding movement of the piston assembly 32 with respect to the pressure tube 30 without generating undue frictional forces as well as sealing the first working chamber 44 from the second working chamber 46.

The piston rod 34 is attached to the piston assembly 32 and extends through the first working chamber 44 and through an upper end cap 50 which closes a first end 51 of the pressure tube 30. An attachment end 53 of the piston rod 34 opposite to the piston assembly 32 is connected to the body 16 of the vehicle 10 (i.e., the sprung portion of vehicle 10). The pressure tube 30 is filled with a hydraulic fluid and includes an attachment fitting 54 at a second end 55 of the pressure tube 30 that is connected to the unsprung portion of the suspension 12 and 14. The first working chamber 44 is thus positioned between the first end 51 of the pressure tube 30 and the piston assembly 32 and the second working chamber 46 is positioned between the second end 55 of the pressure tube 30 and the piston assembly 32. Suspension movements of the vehicle 10 will cause extension/rebound or compression movements of the piston assembly 32 with respect to the pressure tube 30. Valving within the piston assembly 32 controls the movement of hydraulic fluid between the first working chamber 44 and the second working chamber 46 during movement of the piston assembly 32 within the pressure tube 30. It should be appreciated that the shock absorber 20 may be installed in a reverse orientation, where the attachment end 53 of the piston rod 34 is connected to the unsprung portion of the suspension 12 and 14 and the attachment fitting 54 is connected to the body 16 (i.e., the sprung portion of the vehicle 10).

With additional reference to FIGS. 3A, 3B, 4, and 5, the piston assembly 32 comprises a piston body 60 that is attached to the piston rod 34, a compression bleed valve assembly 62, a rebound bleed valve assembly 64, a compression blowoff valve assembly 66, and a rebound blowoff valve assembly 68. Piston rod 34 includes a reduced diameter section 70 located on the end of piston rod 34 that is disposed within pressure tube 30 such that the reduced diameter section 70 forms a shoulder 72 that abuts the piston assembly 32. Piston body 60 is located on reduced diameter section 70 with the compression bleed valve assembly 62 and the compression blowoff valve assembly 66 being located longitudinally between the piston body 60 and the shoulder 72 and with the rebound bleed valve assembly 64 and the rebound blowoff valve assembly 68 being located longitudinally between the piston body 60 and a threaded end 74 of the piston rod 34. A retaining nut 76 cooperates with the threaded end 74 of the piston rod 34 to secure the compression blowoff valve assembly 66, the compression bleed valve assembly 62, the piston body 60, the rebound bleed valve assembly 64, and the rebound blowoff valve assembly 68 to the piston rod 34. The piston body 60 abuts the compression bleed valve assembly 62, which abuts the compression blowoff valve assembly 66, which abuts the shoulder 72 formed on piston rod 34. The piston body 60 also abuts the rebound bleed valve assembly 64, which abuts the rebound blowoff valve assembly 68, which abuts a retaining nut 76. The retaining nut 76 secures the piston body 60, the compression bleed valve assembly 62, the compression blowoff valve assembly 66, the rebound bleed valve assembly 64, and the rebound blowoff valve assembly 68 to the piston rod 34.

With continued reference to FIGS. 3A, 3B, 4, and 5, the piston body 60 includes a first surface 80 on a first side 82 of the piston body 60 and a second surface 84 on a second side 86 of the piston body 60. The first surface 80 is opposite and spaced apart from the second surface 84 along the longitudinal axis 35. In some embodiments, the first surface 80 and the second surface 84 may be planar surfaces. The first surface 80 and the first side 82 may face the first working chamber 44. The second surface 84 and the second side 86 may face the second working chamber 46. The piston body 60 includes a center hole 88, through which the piston rod 34 is configured to extend. The piston body 60 further includes hubs 90 surrounding the center hole 88 and extending from the first surface 80 and the second surface 84, respectively. Each hub 90 terminates in a hub face 92. An outer circumferential portion 94 of the piston body 60 is configured to receive the seal 48. The piston body 60 defines a plurality of compression flow blowoff passages 96, a plurality of rebound flow blowoff passages 98, and a plurality of bleed flow passages 100. The compression flow blowoff passages 96, the rebound flow blowoff passages 98, and the bleed flow passages 100 are passages through which hydraulic fluid may flow. Thus, each of the compression flow blowoff passages 96, the rebound flow blowoff passages 98, and the bleed flow passages 100 may be referred to as a fluid passage.

Compression Bleed Valve Assembly & Rebound Bleed Valve Assembly

The compression bleed valve assembly 62 comprises, for example, a first set of valve components, such as a restriction disc 102, an orifice disc 104, a fulcrum disc 106, a check disc 108, and a spring 110. The restriction disc 102, the orifice disc 104, the fulcrum disc 106, the check disc 108, and the spring 110 of the compression bleed valve assembly 62 are configured to be in a stacked arrangement along the axis 35 on the first side 82 of the piston body 60.

The rebound bleed valve assembly 64 comprises, for example, a second set of valve components, wherein the second set of valve components comprises the same type and number of components as the first set of valve components. The rebound bleed valve assembly 64 comprises, for example, a restriction disc 102, an orifice disc 104, a fulcrum disc 106, and a check disc 108, and a spring 110. The restriction disc 102, the orifice disc 104, the fulcrum disc 106, the check disc 108, and the spring 110 of the rebound bleed valve assembly 64 are configured to be in a stacked arrangement along the axis 35 on the second side 86 of the piston body 60.

Although the compression bleed valve assembly 62 and the rebound bleed valve assembly 64 are shown and described as having the same type and number of components, in some embodiments, the type and number of components in the compression bleed valve assembly 62 may differ from the type and number of components in the rebound bleed valve assembly 64. Additionally, in some embodiments, the one or more of the compression bleed valve assembly 62 and the rebound bleed valve assembly 64 may include additional, fewer, and/or other components without departing from the scope of the invention. Thus, the exact type, number, and/or arrangement of components is not required. The restriction disc 102, the orifice disc 104, and the check disc 108 may be referred to as bleed discs.

Figure 3A:
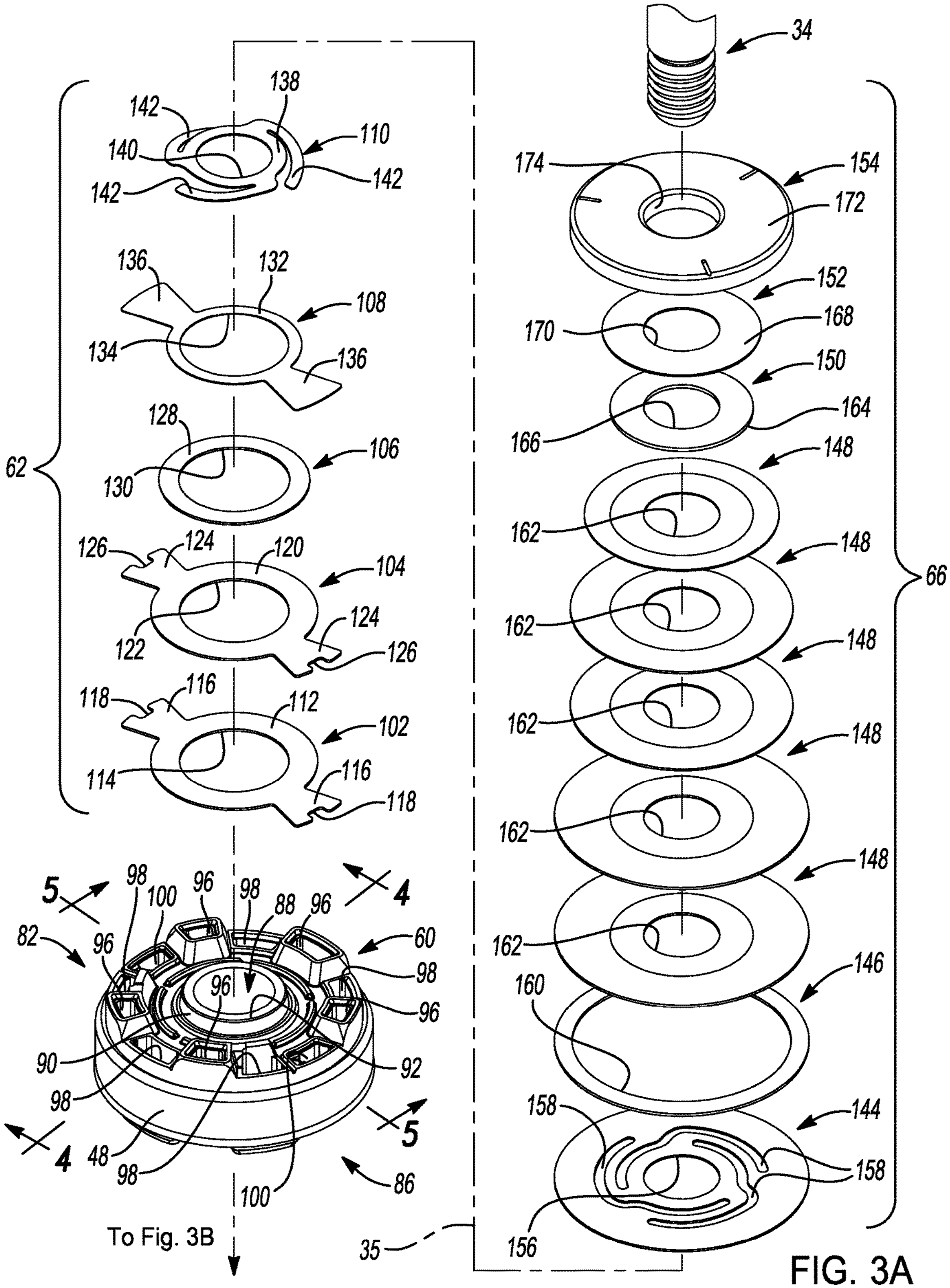
FIG. 3A is an exploded perspective view depicting a piston body, a compression bleed valve assembly, a compression blowoff valve assembly, and the piston rod of the shock absorber illustrated in FIG. 2.
Figure 3B:
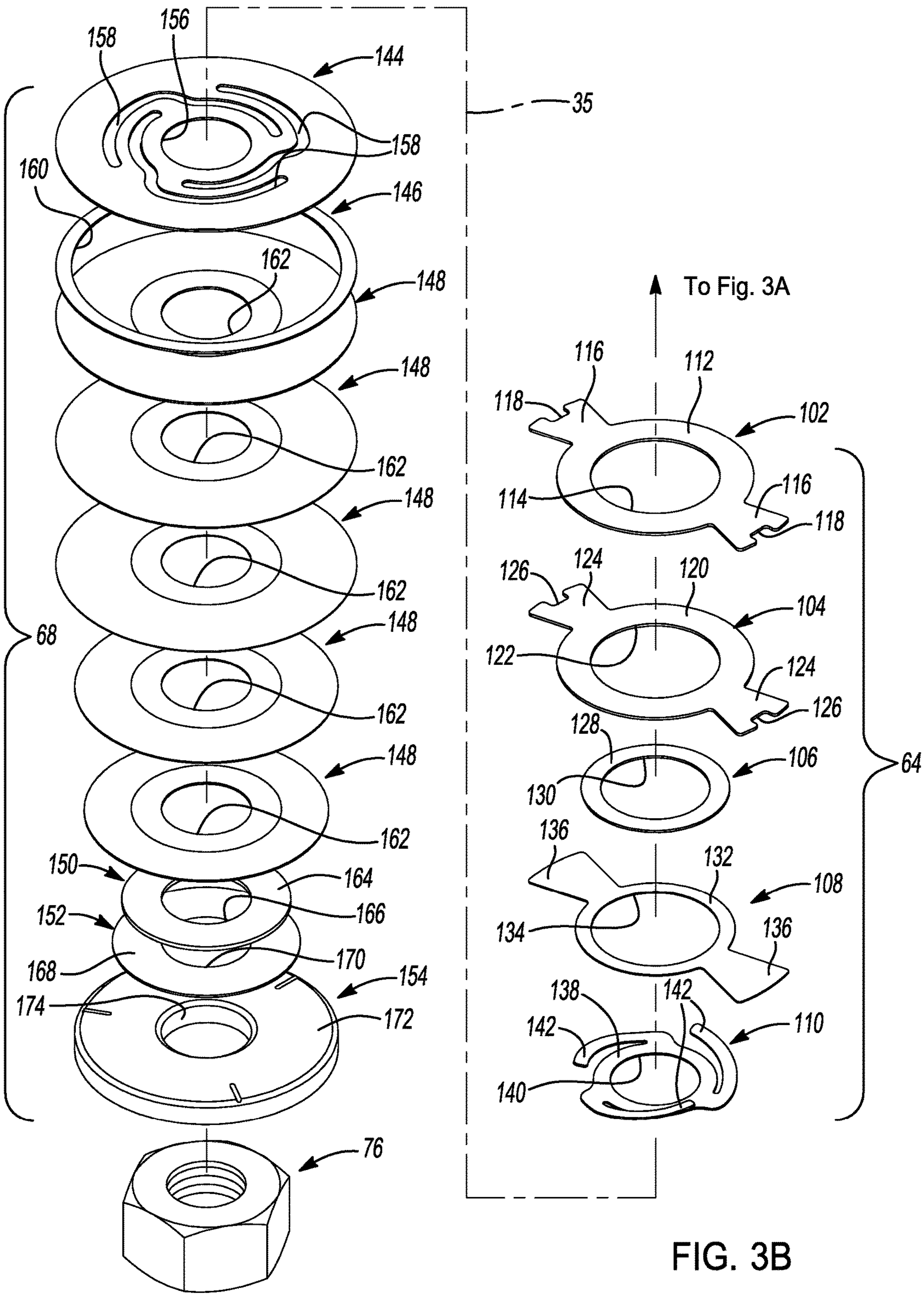
FIG. 3B is an exploded perspective view depicting a rebound bleed valve assembly, a rebound blowoff valve assembly, and a retaining nut of the shock absorber illustrated in FIG. 2.

With continued reference to FIGS. 3A and 3B, each of the restriction disc 102, the orifice disc 104, the fulcrum disc 106, and the check disc 108, and the spring 110 are shown and described in greater detail.

Restriction Disc

The restriction disc 102 includes a ring 112 having a center hole 114, and fingers 116 extending radially outward from the ring 112. In some embodiments, the fingers 116 are opposite each other such that the fingers 116 are spaced from each other at generally 180 degrees around the axis 35. In some embodiments, the fingers 116 are spaced from each other at an angle less than or greater than 180 degrees around the axis 35. The restriction disc 102 may be bow-tie shaped. For example, the width of the fingers 116 increases along the fingers 116, such that the fingers 116 get wider as the fingers 116 extend away from the ring 112. Although shown as bow-tie shaped, in some embodiments, the restriction disc 102 may have fingers 116 of other shapes, such as for example only, rectangular or square. Although shown as having two fingers 116, the restriction disc 102 may each include only one, or more than two, fingers 116. The restriction disc 102 is movable from an unflexed/undeflected position to a flexed/deflected position. In the unflexed/undeflected position, the restriction disc 102 the fingers 116 of the restriction disc 102 are configured to be in contact with the piston body 60.

The restriction disc 102 further includes one or more orifices 118. For example, each finger 116 includes one orifice 118 that extends radially inward from the outer edge of each finger 116 of the restriction disc 102. The orifices 118 are configured to permit fluid flow axially and/or radially relative to the axis 35 of the shock absorber 20. The hydraulic fluid is able to flow through the orifices 118 and the bleed flow passages 100. Each orifice 118 is open in an axial direction and is configured to permit fluid flow axially relative to axis 35 through the restriction disc 102. Additionally, each orifice 118 is open in a radial direction and is configured to permit fluid flow radially relative to axis 35 through the orifices 118 at the outer edges of the fingers 116. In some embodiments, the orifices 118 are configured to remain open to fluid flow regardless of position of the restriction disc 102.

Orifice Disc

The orifice disc 104 includes a ring 120 having a center hole 122, and fingers 124 extending radially outward from the ring 120. In some embodiments, the fingers 124 are opposite each other such that the fingers 124 are spaced from each other at generally 180 degrees around the axis 35. The orifice disc 104 may be bow-tie shaped. For example, the width of the fingers 124 increases along the fingers 124, such that the fingers 124 get wider as the fingers 124 extend away from the ring 120. Although shown as bow-tie shaped, in some embodiments, the orifice disc 104 may have fingers 124 of other shapes, such as for example only, rectangular or square. Although shown as having two fingers 124, the orifice disc 104 may each include only one, or more than two, fingers 124. In some embodiments, the fingers 124 of the orifice disc 104 have the same size and shape as the fingers 116 of the restriction disc 102.

The orifice disc 104 further includes one or more orifices 126. For example, each finger 124 includes one orifice 126 that extends radially inward from the outer edge of each finger 124 of the orifice disc 104. In some embodiments, the orifices 126 of the orifice disc 104 have the same size and shape as the orifices 118 of the restriction disc 102. In some embodiments, the orifices 126 of the orifice disc 104 have a size and/or shape different from the orifices 118 of the restriction disc 102.

The orifices 126 are configured to permit fluid flow axially and/or radially relative to the axis 35 of the shock absorber 20. The hydraulic fluid is able to flow through the orifices 126 and the bleed flow passages 100. Each orifice 126 is open in an axial direction and is configured to permit fluid flow axially relative to axis 35 through the orifice disc 104. Additionally, each orifice 126 is open in a radial direction and is configured to permit fluid flow radially relative to axis 35 through the orifices 126 at the outer edges of the fingers 124. In some embodiments, the orifices 126 are configured to remain open to fluid flow regardless of position of the orifice disc 104.

Fulcrum Disc

The fulcrum disc 106 comprises a ring 128 having a center hole 130. The fulcrum disc 106 is configured to provide a fulcrum point for the check disc 108.

Check Disc

The check disc 108 includes a ring 132 having a center hole 134, and fingers 136 extending radially outward from the ring 132. In some embodiments, the fingers 136 are opposite each other such that the fingers 136 are spaced from each other at generally 180 degrees around the axis 35. The check disc 108 may be bow-tie shaped. For example, the width of the fingers 136 increases along the fingers 136, such that the fingers 136 get wider as the fingers 136 extend away from the ring 132. Although shown as bow-tie shaped, in some embodiments, the check disc 108 may have fingers 136 of other shapes, such as for example only, rectangular or square. Although shown as having two fingers 136, the check disc 108 may each include only one, or more than two, fingers 136. In some embodiments, the fingers 136 of the check disc 108 have the same size and shape as the fingers 116 of the restriction disc 102 and/or the fingers 124 of the orifice disc 104.

Spring

The spring 110 includes a ring 138 having a center hole 140, and a plurality of arms 142 extending circumferentially and radially outward from the ring 138. The plurality of arms 142 are further bent at an angle with respect to a plane formed by the ring 138. The spring 110 is made from an elastically deformable material, such as for example, spring steel, plastic having suitable elastic properties, etc. Although shown as having three arms 142, the spring 110 may each include only one, two, or more than three, arms 142. In some embodiments, the spring 110 may be a wave spring.

Compression & Rebound Valve Assembly

The compression blowoff valve assembly 66 comprises, for example, a third set of valve components, such as a blowoff disc 144, a ring 146, a plurality of valve plates 148, a fulcrum disc 150, a fulcrum support disc 152, and a valve stop 154. The blowoff disc 144, the ring 146, the plurality of valve plates 148, the fulcrum disc 150, a fulcrum support disc 152, and the valve stop 154 of the compression blowoff valve assembly 66 are configured to be in a stacked arrangement along the axis 35 on the first side 82 of the piston body 60, wherein the compression bleed valve assembly 62 is configured to be located between piston body 60 and the compression blowoff valve assembly 66.

The rebound blowoff valve assembly 68 comprises, for example, a fourth set of valve components, wherein the fourth set of valve components comprises the same type and number of components as the third set of valve components. The rebound blowoff valve assembly 68 comprises, for example, a blowoff disc 144, a ring 146, a plurality of valve plates 148, a fulcrum disc 150, a fulcrum support disc 152, and a valve stop 154. The blowoff disc 144, the ring 146, the plurality of valve plates 148, the fulcrum disc 150, a fulcrum support disc 152, and the valve stop 154 of the of the rebound blowoff valve assembly 68 are configured to be in a stacked arrangement along the axis 35 on the second side 86 of the piston body 60, wherein the rebound bleed valve assembly 64 is configured to be located between piston body 60 and the rebound blowoff valve assembly 68.

Although the compression blowoff valve assembly 66 and the rebound blowoff valve assembly 68 are shown and described as having the same type and number of components, in some embodiments, the type and number of components in the compression blowoff valve assembly 66 may differ from the type and number of components in the rebound blowoff valve assembly 68. Additionally, in some embodiments, the one or more of the compression blowoff valve assembly 66 and the rebound blowoff valve assembly 68 may include additional, fewer, and/or other components without departing from the scope of the invention. Thus, the exact type, number, and/or arrangement of components is not required.

With continued reference to FIGS. 3A and 3B, each of the blowoff disc 144, the ring 146, the plurality of valve plates 148, the fulcrum disc 150, and the valve stop 154 are shown and described in greater detail.

Blow Off Disc

The blowoff disc 144 is a circular disc having a center hole 156 and a plurality of openings 158. The openings 158 are arranged about the axis 35. In some embodiments, the openings 158 of the blowoff disc 144 circumferentially overlap where two or more openings 158 are along a common radius extending from the axis 35. Such openings 158 may be spaced from each other along the radius of the blowoff disc 144. The openings 158 are configured to decrease a stiffness of the blowoff disc 144. The openings 158 are configured to permit fluid flow from one side of the blowoff disc 144 to another side of the blowoff disc 144. Although shown as having three openings 158, in some embodiments, the blowoff disc 144 includes more than three openings 158. In some embodiments, the blowoff disc 144 includes less than three openings 158. In some embodiments, the blowoff disc 144 includes no openings 158.

Ring

The ring 146 is circular in shape, having a center hole 160. The ring 146 may be metal, plastic, or any suitable material. The ring 146 is configured to be radially outward of the openings 158 of the blowoff disc 144. The ring 146 is configured to provide internal preload forces to the valve plates 148.

Valve Plates

The valve plates 148 are circular discs and include a center hole 162. The valve plates 148 are elastically deformable. For example, force applied to an outer edge of the valve plates 148 may cause the valve plates 148 to flex such that the outer edge is moved axially relative the respective center hole 162 of the valve plates 148. The valve plates 148 are made from an elastically deformable material, such as for example, spring steel, plastic having suitable elastic properties, etc.

In some embodiments, the valve plates 148 have different diameters. For example, the as shown in FIGS. 3A, 3B, 4, and 5, the valve plates 148 are arranged such that the valve plate 78 with the largest diameter is placed closest to the piston body 60 and the valve plate 78 with the smallest diameter is placed furthest away from the piston body 60. Accordingly, the diameter of each valve plate 78 decreases as a function of the distance from the piston body 60 along the axis 35. For example, the first valve plate 78 closest to the piston body 60 has a larger outer diameter than an outer diameter of an immediately adjacent valve plate 78, and so on. The valve plate 78 farthest from the piston body 60 thus has a diameter smaller than diameters of the other valve plates 78. As another example, the valve plates 148 may be configured similar to a leaf spring.

Fulcrum Disc

The fulcrum disc 150 comprises a ring 164 having a center hole 166. The fulcrum disc 150 provides a fulcrum point or bending point for the valve plates 148. For example, the fulcrum discs 150 abuts the smallest valve plate 78 opposite the adjacent larger valve plate 78. Such fulcrum disc 150 has a smaller outer diameter than the abutting smallest valve plate 78.

Fulcrum Support Disc

The fulcrum support disc 152 comprises a ring 168 having a center hole 170. The fulcrum support disc 152 positions the valve plates 148 away from valve stop 154 a predetermined amount to allow the valve plates 148 to flex during operation. The fulcrum support disc 152 may also be configured to limit the deflection of the valve plates 148.

Valve Stop

The valve stop (or preload spacer) 154 comprises a ring 172 having a center hole 174. The valve stop 154 is configured to protect the valve plates 78. The valve stop 154 is configured to limit the deflection of the valve plates 148.

Piston Body

Figure 4:
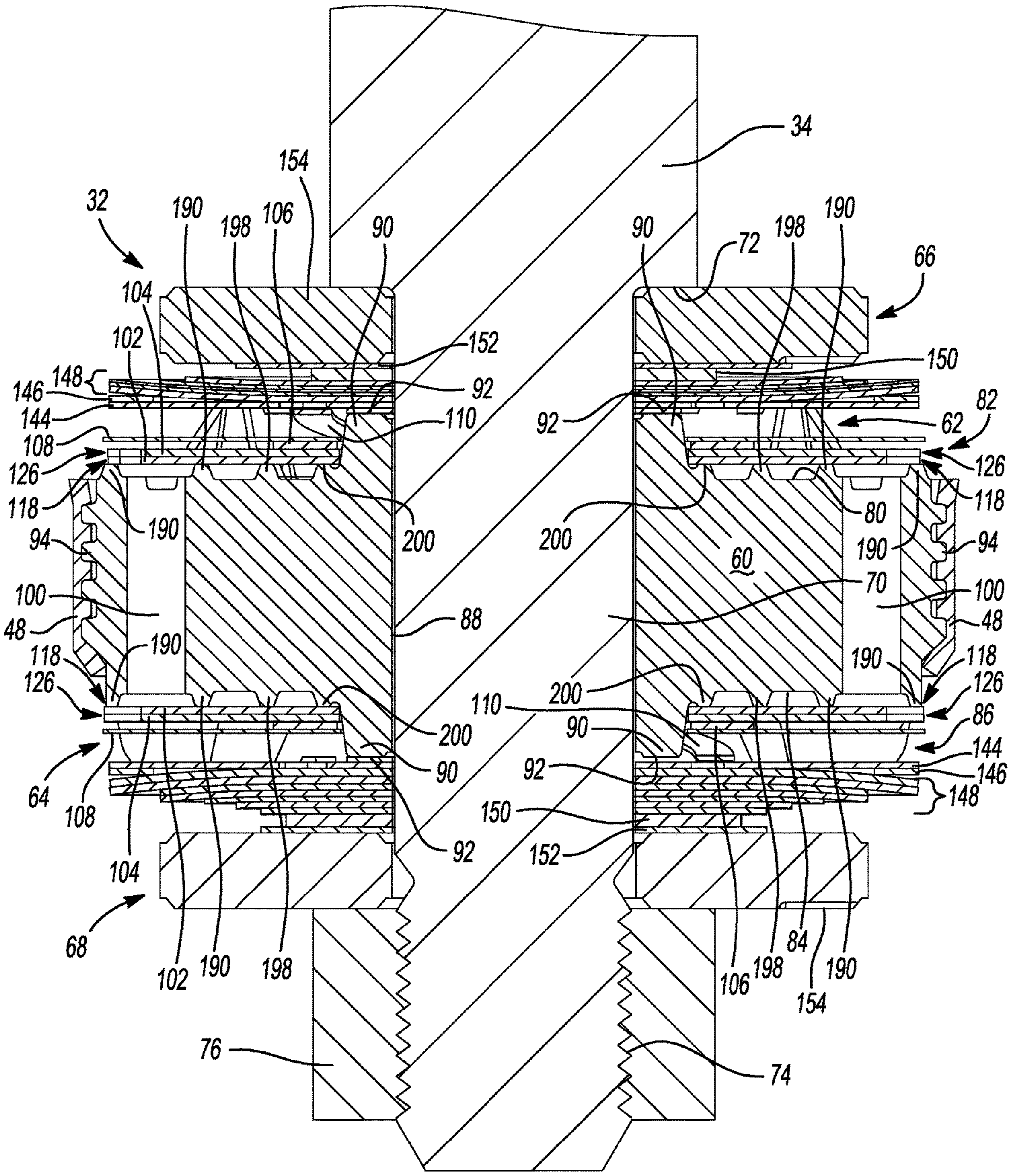
FIG. 4 is a cross-sectional view of the shock absorber taken from line 4-4 in FIG. 3A.
Figure 5:
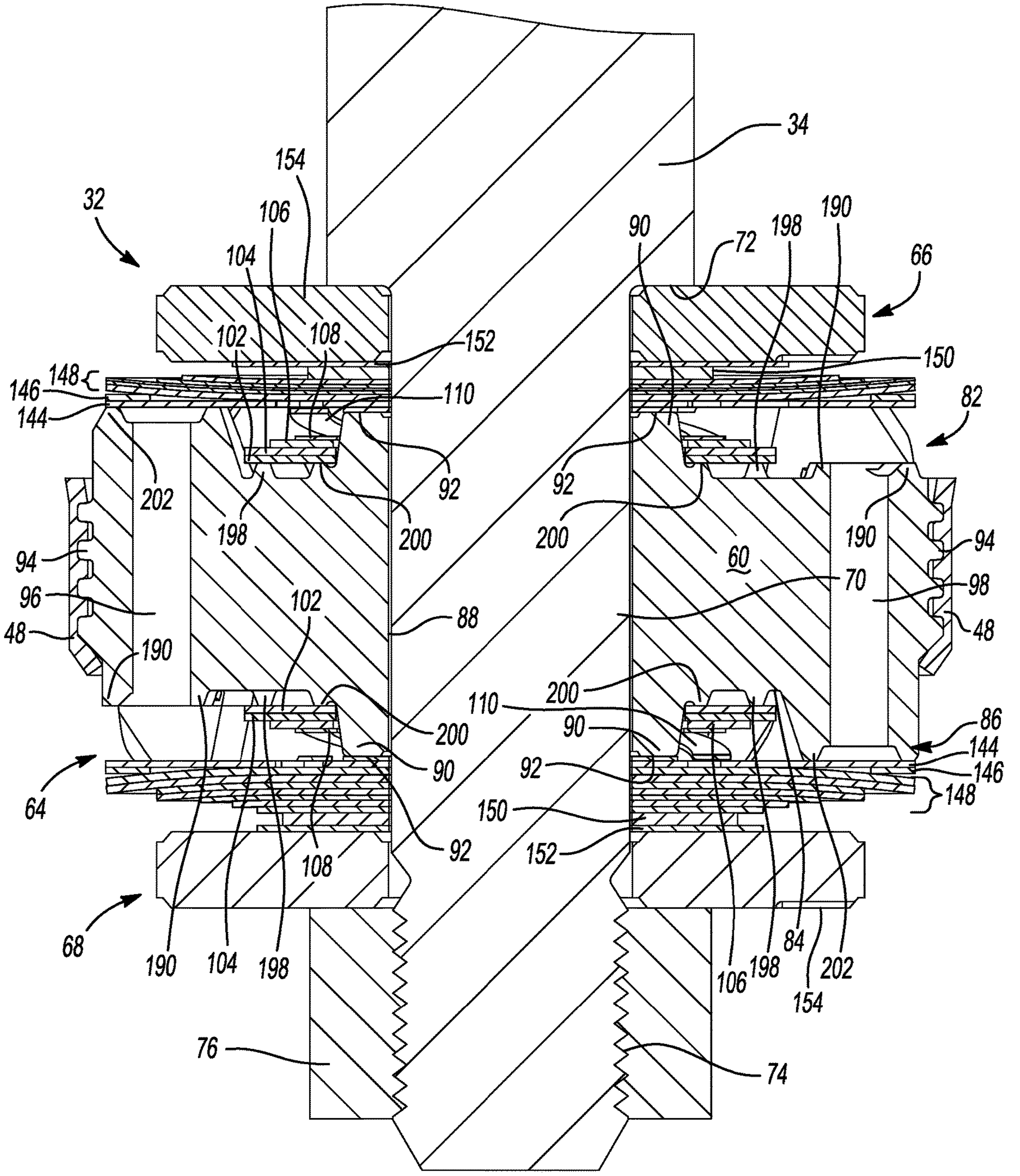
FIG. 5 is a cross-sectional view of the shock absorber taken from line 5-5 in FIG. 3A.
Figure 6A:
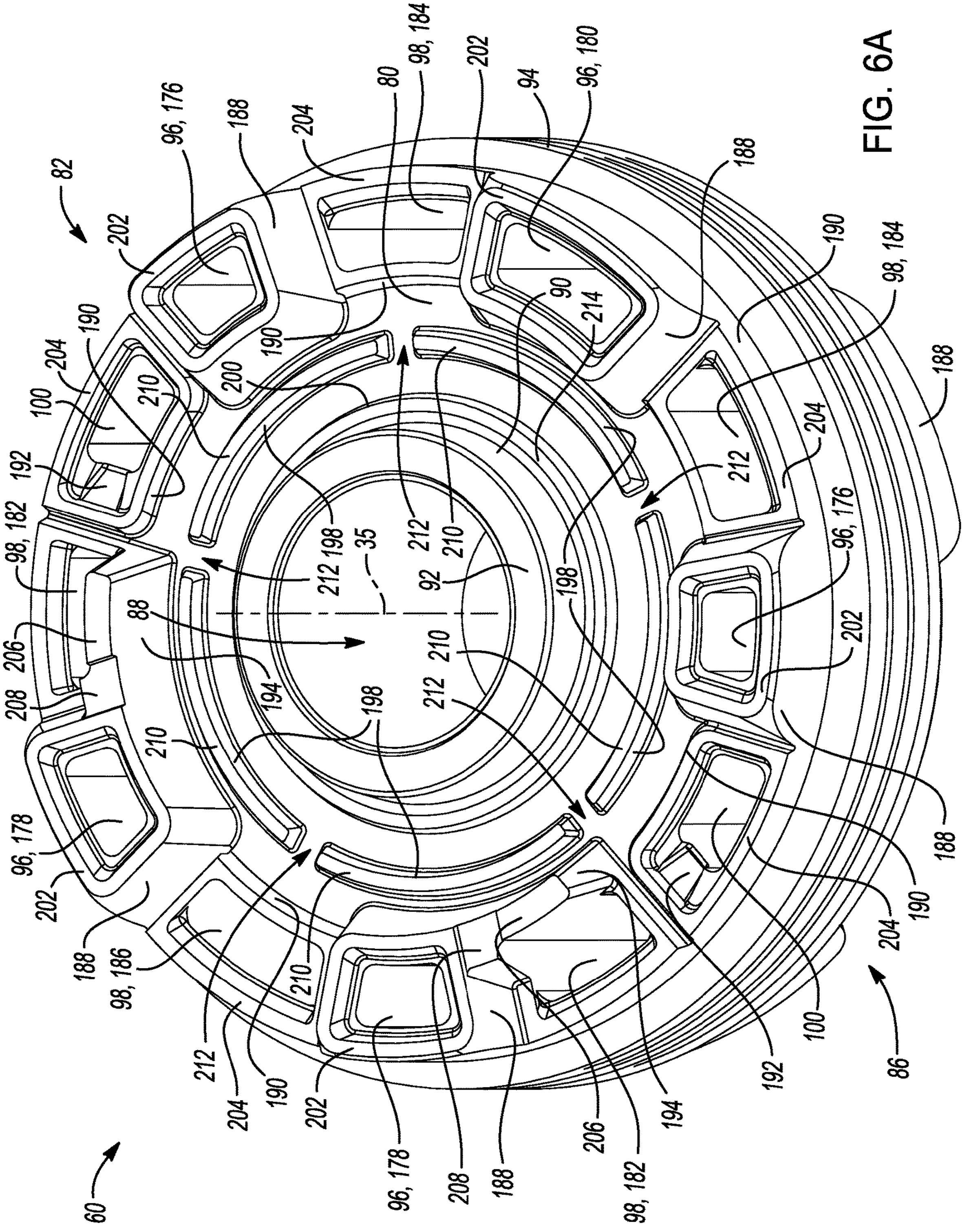
FIG. 6A is a perspective view of the first side of an exemplary piston body in accordance with the teachings of the present disclosure.

With reference to FIGS. 4, 5, and 6A additional details of the piston body 60 are shown and described. The plurality of compression flow blowoff passages 96 include, for example, first compression blowoff passages 176, second compression blowoff passages 178, and a third compression blowoff passage 180. The plurality of rebound flow blowoff passages 98 include, for example, first rebound blowoff passages 182, second rebound blowoff passages 184, and a third rebound blowoff passage 186.

The piston body 60 further includes additional features that are provided on both the first side 82 and the second side 86 of the piston body 60. The additional features of the piston body 60 include a plurality of first circumferential walls 188 and a plurality of second circumferential walls 190. The piston body 60 may further include one or more additional optional features, such as for example, one or more notches 192, one or more walls 194, one or more ribs 196 (see FIG. 6B), one or more supports 198, and one or more supports 200. As shown in FIGS. 4, 5, and 6A, these features are identical on the first surface 80 and the second surface 84. Therefore, for brevity and clarity these features will be described only with respect to the first side 82 of the piston body 60. It will be understood that in some embodiments, the features on the first side 82 of the piston body 60 may differ from the features on the second side 86 of the piston body 60. It will also be understood that in some embodiments of the piston body 60 that not all features are required.

First & Second Circumferential Walls & Lands

The plurality of first circumferential walls 188 located on the first side 82 of the piston body 60 extend from the first surface 80 of the piston body 60 away from the second surface 84. Each first circumferential wall 188 terminates at a distal end with a first circumferential land 202. In some embodiments, the first circumferential lands 202 are parallel to the first surface 80. On the first side 82 of the piston body 60, each compression flow blowoff passage 96 is surrounded by a respective first circumferential wall 188 and first circumferential land 202. For example, on the first side 82 of the piston body 60, each of the first compression blowoff passages 176, the second compression blowoff passages 178, and the third compression blowoff passage 180 are surrounded by a respective first circumferential wall 188 and first circumferential land 202.

The first circumferential lands 202 on the first side 82 of the piston body 60 are located a first distance away from the first surface 80 and a greater distance from the second surface 84. During operation of the shock absorber 20, a blowoff disc, such as for example the blowoff disc 144, is configured to be selectively driven into engagement with the first circumferential lands 202. The first circumferential lands 202 provide a first sealing surface configured to selectively seal with a blowoff disc, such as for example the blowoff disc 144.

The plurality of second circumferential walls 190 located on the first side 82 of the piston body 60 extend from the first surface 80 of the piston body 60 away from the second surface 84. Each second circumferential wall 190 terminates at a distal end with a second circumferential land 204. In some embodiments, the second circumferential lands 204 are parallel to the first surface 80. On the first side 82 of the piston body 60, each rebound flow blowoff passage 98 and each bleed flow passage 100 is surrounded by a respective second circumferential wall 190 and second circumferential land 204. For example, on the first side 82 of the piston body 60, each of the second rebound blowoff passages 184, the third rebound blowoff passage 186, and the bleed flow passages 100 are surrounded by a respective second circumferential wall 190 and second circumferential land 204.

The second circumferential lands 204 on the first side 82 of the piston body 60 are located a second distance away from the first surface 80 of the piston body 60. The second distance is less than the first distance. The second circumferential lands 204 are longitudinally between the first surface 80 of the piston body 60 and the first circumferential lands 202.

During operation of the shock absorber 20, a portion of a bleed disc, such as for example the restriction disc 102, is configured to be selectively driven into engagement with the second circumferential lands 204. For example, at least portion of the fingers 116 of the restriction disc 102 are configured to be selectively driven into engagement with the second circumferential lands 204. When the fingers 116 are engaged with the second circumferential lands 204 the fingers 116 and the second circumferential lands 204 cooperate to form a seal at the interface between the fingers 116 and the second circumferential lands 204. The smaller surface area of the second circumferential lands 204 is easier to seal than the entire flat surface of a typical piston body. Additionally, the second circumferential walls 190 and the second circumferential lands 204 minimize the risk of small particles, such as contaminants, in the hydraulic fluid being stuck under the restriction disc 102, between the restriction disc 102 and the piston body 60, and creating a leak path. The second circumferential lands 204 therefore provide improved sealing capabilities of the restriction disc 102 and more repeatable closing behavior results as compared to typical piston bodies.

Angled Notch

With continued reference to FIG. 6A, within the second circumferential wall 190 surrounding the bleed flow passage 100, and between the second circumferential wall 190 and the bleed flow passage 100, there is provided a notch 192 that is angled or sloped toward the bleed flow passage 100, forming a flow guiding feature configured to enhance the flow of hydraulic fluid into the bleed flow passage 100. In some embodiments, the angle of the notch 192 with respect to the first surface 80 of the piston body 60 may range from about 10 degrees to about 80 degrees. In some embodiments, the angle of the notch 192 with respect to the first surface 80 of the piston body 60 may range from about 20 degrees to about 60 degrees. In some embodiments, the angle of the notch 192 with respect to the first surface 80 of the piston body 60 may range from about 30 degrees to about 50 degrees. In some embodiments, the angle of the notch 192 with respect to the first surface 80 of the piston body 60 may be about 45 degrees. In some embodiments, the angle of the notch 192 with respect to the first surface 80 of the piston body 60 may be about 22 degrees.

As shown in FIG. 6A, the notch 192 has a width less than the radial length of the bleed flow passage 100. The notch 192 is aligned generally in the middle of the radial length of the bleed flow passage 100. In some embodiments, the notch 192 has a width equal to the radial length of the bleed flow passage 100. The width of the notch 192 proximate to the second circumferential wall 190 is greater than the width of the notch 192 proximate to the bleed flow passage 100. However, in some embodiments, the width of the notch 192 proximate to the second circumferential wall 190 may be less than the width of the notch 192 proximate to the bleed flow passage 100. In other embodiments, the width of the notch 192 proximate to the second circumferential wall 190 may be equal to the width of the notch 192 proximate to the bleed flow passage 100.

The notch 192 is configured to provide an increased available bleed tuning area without compromising on blow off area by optimizing the use of the area between the bleed flow passage 100 and an adjacent blowoff passage, such as for example the first rebound blowoff passage 182. The notch 192 provides an additional area for hydraulic fluid flow.

Walls & Lands

The one or more walls 194 of the piston body 60 are located on the first side 82 of the piston body 60 proximate to one or more of the rebound flow blowoff passages 98. For example, one or more walls 194 extend from the first surface 80 of the piston body 60 away from the second surface 84. The one or more walls 194 may be located radially between the center hole 88 and one or more of the rebound flow blowoff passages 98. Each wall 194 terminates at a distal end with a land 206, wherein each land 206 is coplanar with the first circumferential lands 202. As shown in FIG. 6A, for example, each wall 194 on the first side 82 of the piston body 60 may be connected to the first circumferential wall 188 of an adjacent compression flow blowoff passage 96, such as the second compression blowoff passage 178. In some embodiments, there is provided an area of lesser elevation or a gap 208 between the adjacent first circumferential land 202 and the land 206, which provides for a flow passage of hydraulic fluid.

During operation of the shock absorber 20, the blowoff disc 144 is configured to be selectively driven into engagement with the lands 206. Due to the presence of two flow passages, such as for example the bleed flow passage 100 and the first rebound blowoff passage 182, between the compression flow blowoff passages 96, such as for example the first compression blowoff passage 176 and the second compression blowoff passage 178, there is a relatively large circumferential distance between some of the compression flow blowoff passages 96. This relatively large circumferential distance could lead to deformation of a blowoff disc, such as for example the blowoff disc 144, which is detrimental to repeatability of the shock absorber 20. Accordingly, the wall 194 and the land 206 thereon provide support for the blowoff disc, such as for example the blowoff disc 144, to reduce or eliminate deformation of the blowoff disc.

The compression flow blowoff passages 96, the rebound flow blowoff passages 98, the first circumferential walls 188, first circumferential lands 202, second circumferential walls 190, and second circumferential lands 204 are located proximate to the outer circumferential portion 94 of the piston body 60.

Supports

The one or more supports 198 of the piston body 60 are located on the first side 82 of the piston body 60. The supports 198 extend from the first surface 80 of the piston body 60 away from the second surface 84. Each support 198 terminates at a distal end with a land 210, wherein each land 210 is coplanar with the second circumferential lands 204. Thus each land 210 is located the same distance as the second distance of the second circumferential lands 204. As shown in FIG. 6A, in some embodiments, the supports 198 extend along the first surface 80, and partially circumferentially around the center hole 88 of the piston body 60 and may be located at a radial distance from the axis 35 between the hub 90 and the compression flow blowoff passages 96 and the rebound flow blowoff passages 98. For example, the supports 198 are arcs of a circle and include one or more discontinuities or gaps 212 between each support 198. In some embodiments, the discontinuities or gaps 212 permit the flow of hydraulic fluid between the supports 198 and the hub 90. In some embodiments, the piston body 60 may have a single support 198. For example, the support 198 may be a circular support around the hub 90 without any gaps or discontinuities. In some embodiments, the supports 198 may extend radially between the hub 90 and the compression flow blowoff passages 96 and the rebound flow blowoff passages 98, wherein the one or more supports 198 are disposed circumferentially spaced apart from one another around the center hole 88 of the piston body 60. The supports 198 are located radially between the hub 90 and the first circumferential lands 202 and the second circumferential lands 204.

Additionally, one or more supports 200 are located on the first side 82 of the piston body 60. The supports 200 extend from the first surface 80 of the piston body 60 away from the second surface 84. Each support 200 terminates at a distal end with a land 214, wherein each land 214 is coplanar with the second circumferential lands 204 and the lands 210 of supports 200. Thus each land 214 is located the same distance as the second distance of the second circumferential lands 204. As shown in FIG. 6A, in some embodiments, the supports 200 extend along the first surface 80 circumferentially around the center hole 88 of the piston body 60 and may be located at a radial distance from the axis 35 between the hub 90 and the supports 200.

The lands 210 are configured to support a surface of a bleed disc, such as the restriction disc 102. The lands 210 are further configured to prevent deformation of the restriction disc 102. The supports 198 on the first side 82 allow for the hydraulic fluid to flow under the restriction disc 102, between the first surface 80 of the piston body 60 and the restriction disc 102. Therefore, the pressure delta that the restriction disc 102 will see is zero because the pressure below and above the restriction disc 102 will be equal. The second circumferential lands 204 and the lands 210 are configured to support a portion of the surface of a bleed disc, such as the restriction disc 102, the second distance away from the first surface 80, wherein the bleed disc, the second circumferential walls 190, and the first supports 198 are configured to cooperate to form a fluid passage into which the hydraulic fluid may flow between the surface of the bleed disc and the first surface 80 of the piston body 60.

The supports 198 serve to reduce the surface area contact between the restriction disc 102 and the piston body 60. With typical piston bodies having a substantially flat surface, there is a relatively large surface area contact between the piston body and any bleed disc placed in contact with the piston body. This relatively large surface area and the hydraulic fluid that can accumulate between the typical piston body and the bleed disc can result in sticking of the bleed disc to the piston body. This sticking can result in undesirable or uncontrolled opening and/or closing behavior of the bleed disc. Accordingly, the reduction in surface area contact provided by the supports 198 reduces or eliminates sticking between the restriction disc 102 and the piston body 60, which can also reduce or eliminate undesirable or uncontrolled opening and/or closing behavior of the restriction disc 102. Additionally, the supports 198 may reduce or eliminate contact noise between the restriction disc 102 and the piston body 60, which may reduce or eliminate noise, vibration, and harshness (NVH) issues. Additionally, together with the second circumferential walls 190 and the second circumferential lands 204, the supports 198, lands 210, supports 200, and lands 214 aid in minimizing the risk of small particles, such as contaminants, in the hydraulic fluid being stuck under the restriction disc 102, between the restriction disc 102 and the piston body 60, and creating a leak path. The second circumferential lands 204, lands 210, and lands 214 may therefore provide improved sealing capabilities of the restriction disc 102 and more repeatable closing behavior results as compared to typical piston bodies.

Rib

Figure 6B:
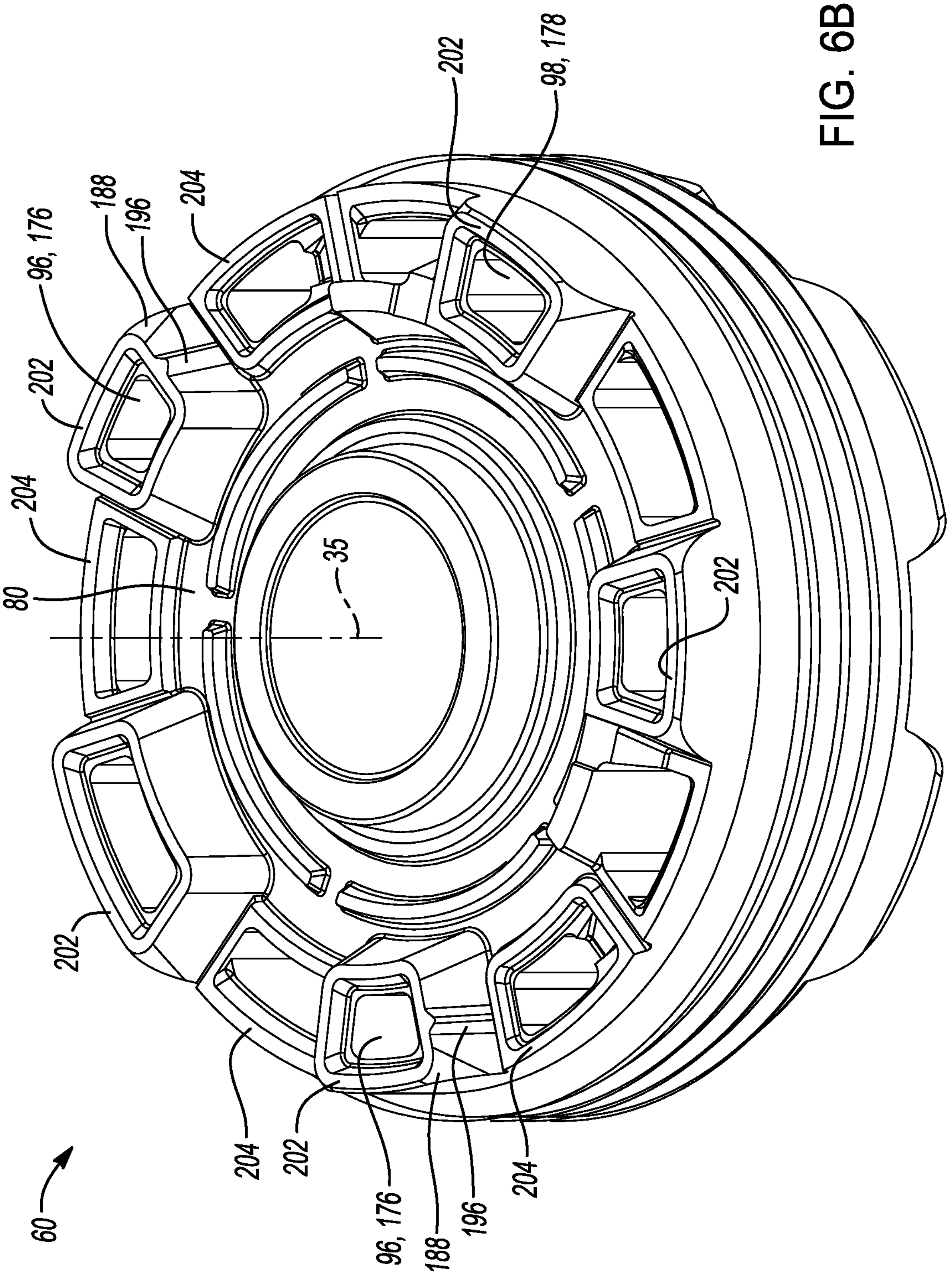
FIG. 6B is a perspective view of the first side of an exemplary piston body in accordance with the teachings of the present disclosure.

As shown in FIG. 6B, in some embodiments, the piston body 60 further includes a rib 196 extending from one or more of the first circumferential walls 188 away from the flow passage surrounded by the first circumferential wall 188. The rib 196 is configured to reduce the contact area between the piston body 60 and the bleed discs, such as for example the restriction disc 102, the orifice disc 104, and the check disc 108. The reduced contact area results in reduced friction by reducing or preventing wiping of the edge of one or more of the bleed discs against the piston body 60. Additionally, by reducing the contact area and the friction between the bleed discs and the piston body 60, the repeatability of the open bleed closing behavior of the bleed discs is increased.

Assembled Compression Bleed & Rebound Bleed Valve Assembly

Having described the components of the compression bleed valve assembly 62 and the rebound bleed valve assembly 64, the position and arrangement of the components of the compression bleed valve assembly 62 and the rebound bleed valve assembly 64 when assembled into the shock absorber 20 are described with reference to FIGS. 3A, 3B, 4, and 5. In some embodiments, as shown in FIGS. 3A, 3B, 4, and 5, the assembled arrangement of the components of the compression bleed valve assembly 62 is the same as the assembled arrangement of the components of the rebound bleed valve assembly 64. That is, the arrangement of components on the first side 82 of the piston body 60 is mirrored on the second side 86 of the piston body 60. Therefore, it will be understood that the below description with respect to the arrangement of the components of the compression bleed valve assembly 62 on the first side 82 of the piston body 60 is the same for the rebound bleed valve assembly 64 on the second side 86 of the piston body 60. It will be understood that this arrangement of components is exemplary and in some embodiments the number, type, and arrangement of components may differ without departing from the scope of the invention.

When assembled into the shock absorber 20, the restriction disc 102 is proximate to the piston body 60, the hub 90 is received in the center hole 114 of the restriction disc 102, and the fingers 116 selectively cover the bleed flow passages 100. For example, the fingers 116 are circumferentially aligned with, and extend radially beyond, the bleed flow passages 100.

The orifice disc 104 is in contact with the restriction disc 102, wherein the restriction disc 102 is located between the piston body 60 and the orifice disc 104. Additionally, when assembled into the shock absorber 20, the hub 90 is received in the center hole 122 of the orifice disc 104 and the fingers 124 of the orifice disc 104 overlap or cover the fingers 116 of the restriction disc 102. Additionally, when assembled into the shock absorber 20, the orifices 126 of the orifice disc 104 are aligned with the orifices 118 of the restriction disc 102. The orifices 126 of the orifice disc 104 and the orifices 118 of the restriction disc 102 cooperate to define a radial open area and an axial open area (parallel to axis 35). The radial open area provides a continuously open fluid flow path to allow for a radial open bleed flow.

The fulcrum disc 106 is in contact with the orifice disc 104, wherein the restriction disc 102 and the orifice disc 104 are located between the piston body 60 and the fulcrum disc 106. Additionally, when assembled into the shock absorber 20, the hub 90 is received in the center hole 130 of the fulcrum disc 106. The fulcrum disc 106 provides a fulcrum point or bending point for the check disc 108.

The check disc 108 is in contact with the fulcrum disc 106, wherein the restriction disc 102, the orifice disc 104, and the fulcrum disc 106 are located between the piston body 60 and the check disc 108. Additionally, when assembled into the shock absorber 20, the hub 90 is received in the center hole 134 of the check disc 108. Additionally, when assembled into the shock absorber 20, the fingers 136 of the check disc 108 are disposed above one or more of the fingers 124 of the orifice disc 104 and the fingers 116 of the restriction disc 102.

The check disc 108 is configured to selectively be in a first position and a second position. When the check disc 108 is in the first position, the fingers 136 of the check disc 108 are above the fingers 124 of the orifice disc 104 and may be separated a distance from the orifice disc 108 that is equal to the thickness of the fulcrum disc 106. Additionally, when the check disc 108 is in the first position, the axial open area and the radial open area are open to the flow of fluid. When the check disc 108 is in the second position, the fingers 136 of the check disc 108 contact the fingers 124 of the orifice disc 104 and cover the orifices 126 of the orifice disc 104 and the orifices 118 of the restriction disc 102. Additionally, when the check disc 108 is in the second position, the axial open area is closed to the flow of fluid and only the radial open area is open to the flow of fluid. With reference to FIG. 4, the check disc 108 includes a first surface selectively engageable with an opposing surface of the orifice disc 104 to close the axial open area.

When assembled into the shock absorber 20, the ring 138 of the spring 110 is in contact with the hub face 92 of the hub 90. Additionally, the spring 110 is oriented such that the arms 142 of spring 110 abut the check disc 108 and serve to exert a force on the check disc 108. This force pushes the stacked check disc 108, fulcrum disc 106, orifice disc 104, and restriction disc 102 against the piston body.

Assembled Compression & Rebound Valve Assembly

Having described the components of the compression blowoff valve assembly 66 and the rebound blowoff valve assembly 68, the position and arrangement of the components of the compression blowoff valve assembly 66 and the rebound blowoff valve assembly 68 when assembled into the shock absorber 20 are described with reference to FIGS. 3A, 3B, 4, and 5. In some embodiments, as shown in FIGS. 3A, 3B, 4, and 5, the assembled arrangement of the components of the compression blowoff valve assembly 66 is the same as the assembled arrangement of the components of the rebound blowoff valve assembly 68. That is, the arrangement of components on the first side 82 of the piston body 60 is mirrored on the second side 86 of the piston body 60. Therefore, it will be understood that the below description with respect to the arrangement of the components of the compression blowoff valve assembly 66 on the first side 82 of the piston body 60 is the same for the rebound blowoff valve assembly 68 on the second side 86 of the piston body 60. It will be understood that this arrangement of components is exemplary and in some embodiments the number, type, and arrangement of components may differ without departing from the scope of the invention.

When assembled into the shock absorber 20, the compression blowoff valve assembly 66 is in contact with at least a part of the compression bleed valve assembly 62 and the rebound blowoff valve assembly 68 is in contact with at least a part of the rebound bleed valve assembly 64.

The blowoff disc 144 is in contact with the spring 110 of the adjacent compression bleed valve assembly 62 or rebound bleed valve assembly 64. The blowoff disc 144 is also in contact with the first circumferential lands 202 of the piston body 60. The ring 146 is in contact with the blowoff disc 144 wherein the blowoff disc 144 is located between the piston body 60 and the ring 146. The plurality of valve plates 148 are provided, wherein a first valve plate 148 of the plurality of valve plates 148 is in contact with the ring 146, and wherein the blowoff disc 144 and the ring 146 are located between the piston body 60 and the plurality of valve plates 148. The fulcrum disc 150 is in contact with the last valve plate 78 of the plurality of valve plates 148. The blowoff disc 144, the ring 146, and the plurality of valve plates 148 are located between the piston body 60 and the fulcrum disc 150. The valve stop 154 is in contact with the fulcrum disc 150, wherein the blowoff disc 144, the ring 146, the plurality of valve plates 148, and the fulcrum disc 150 are located between the piston body 60 and the valve stop 154.

Function

During a compression stroke, there are three flows of fluid between the second working chamber 46 and the first working chamber 44. The first flow of fluid is through a continuously open fluid flow path through the radial open area formed by the orifices 118 extending to the edge of the restriction disc 102 and the orifices 126 extending to the edge of the orifice disc 104 of the rebound bleed valve assembly 64 and the radial open area formed by the orifices 118 extending to the edge of the restriction disc 102 and the orifices 126 extending to the edge of the orifice disc 104 of the compression bleed valve assembly 62 which allows fluid flow at zero or near zero velocity of piston assembly 32 during a compression stroke. In addition, a second flow of fluid is through the axial open area (parallel to axis 35) formed by the orifices 118 in the restriction disc 102 and the orifices 126 in the orifice disc 104 of the rebound bleed valve assembly 64 and the axial open area (parallel to axis 35) formed by the orifices 118 in the restriction disc 102 and the orifices 126 in the orifice disc 104 of the compression bleed valve assembly 62 during a compression stroke. A third flow of fluid is through the compression flow blowoff passages 96.

In operation, a compression stroke of piston assembly 32 causes the fluid pressure in the second working chamber 46, in the plurality of compression flow blowoff passages 96 and in the plurality of bleed flow passages 100 to increase. Initially, fluid flows into the bleed flow passages 100, through the orifices 126 in orifice disc 104 and the orifices 118 in the restriction disc 102 of the rebound bleed valve assembly 64, through the bleed flow passages 100, through the orifices 118 in the restriction disc 102 and the orifices 126 in the orifice disc 104 of the compression bleed valve assembly 62 and into the first working chamber 44. In this condition, fluid flows through both the first and second flows of fluid.

When the speed of piston assembly 32 increases, fluid pressure within the second working chamber 46 will increase and the fluid pressure force applied to the check disc 108 of the rebound bleed valve assembly 64 will deflect the check disc 108 upward toward the orifice disc 104 to close the axial open area (or second fluid flow) formed by the orifices 118 in the restriction disc 102 and the orifices 126 in the orifice disc 104 of the rebound bleed valve assembly 64 to shut off the second fluid flow and only allow fluid flow through the radial open area (or first fluid flow) formed by the orifices 118 in the restriction disc 102 and the orifices 126 in the orifice disc 104 of the rebound bleed valve assembly 64.

When the speed of piston assembly 32 increases further, fluid pressure within the plurality of compression flow blowoff passages 96 will increase and the fluid pressure force applied to the blowoff disc 144 of the compression blowoff valve assembly 66 will overcome the biasing load of the ring 146 and the valve plates 148 of the compression blowoff valve assembly 66 and the blowoff disc 144 of the compression blowoff valve assembly 66 will move axially to open the plurality of compression flow blowoff passages 96 to provide the third flow of fluid.

During a rebound stroke, there are also three flows of fluid between the first working chamber 44 and the second working chamber 46. The first flow of fluid is through a continuously open fluid flow path through the radial open area formed by the orifices 118 extending to the edge of the restriction disc 102 and the orifices 126 in the orifice disc 104 extending to the edge of the compression bleed valve assembly 62 and the radial open area formed by the orifices 118 extending to the edge of the restriction disc 102 and the orifices 126 extending to the edge of the orifice disc 104 of the rebound bleed valve assembly 64 which allows fluid flow at zero or near zero velocity of piston assembly 32 during a rebound stroke. In addition, a second fluid flow of fluid is through the axial open area (parallel to axis 35) formed by the orifices 118 in the restriction disc 102 and the orifices 126 in the orifice disc 104 of the compression bleed valve assembly 62 and the axial open area (parallel to axis 35) formed by the orifices 118 in the restriction disc 102 and the orifices 126 in the orifice disc 104 of the rebound bleed valve assembly 64 during a rebound stroke. A third flow of fluid is through the rebound flow blowoff passages 98.

In operation, a rebound stroke of piston assembly 32 causes the fluid pressure in the first working chamber 44, in the plurality of rebound flow blowoff passages 98 and in the plurality of bleed flow passages 100 to increase. Initially, fluid flows into the bleed flow passages 100, through the orifices 126 in orifice disc 104 and the orifices 118 in the restriction disc 102 of the compression bleed valve assembly 62, through the bleed flow passages 100, through the orifices 118 in the restriction disc 102 and the orifices 126 in orifice disc 104 of the rebound bleed valve assembly 64 and into the second working chamber 46. In this condition, fluid flows through both the first and second flows of fluid.

When the speed of piston assembly 32 increases, fluid pressure within the first working chamber 44 will increase and the fluid pressure force applied to the check disc 108 of the compression bleed valve assembly 62 will deflect the check disc 108 downward toward the orifice disc 104 to close the axial open area (or second fluid flow) formed by the orifices 118 in the restriction disc 102 and the orifices 126 in the orifice disc 104 of the compression bleed valve assembly 62 to shut off the second fluid flow and only allow fluid flow through the radial open area (or first fluid flow) formed by the orifices 118 in the restriction disc 102 and the orifices 126 in the orifice disc 104 of the compression bleed valve assembly 62. With reference to FIG. 4, the check disc 108 includes a first surface selectively engageable with an opposing surface of the orifice disc 104 to close the axial open area.

When the speed of piston assembly 32 increases further, fluid pressure within the plurality of rebound flow blowoff passages 98 will increase and the fluid pressure force applied to the blowoff disc 144 of the rebound blowoff valve assembly 68 will overcome the biasing load of the ring 146 and the valve plates 148 of the rebound blowoff valve assembly 68 and the blowoff disc 144 of the rebound blowoff valve assembly 68 will move axially to open the plurality of rebound flow blowoff passages 98 to provide the third flow of fluid.

The tuning of the shock absorber 20 can be controlled by controlling the size and number of compression flow blowoff passages 96, rebound flow blowoff passages 98, and bleed flow passages 100, the angle and/or size of the notches 192 in the piston body 60, the design, type, number, and/or arrangement of the components of the compression bleed valve assembly 62, the rebound bleed valve assembly 64, the compression blowoff valve assembly 66, and the rebound blowoff valve assembly 68, as well as other design features for shock absorber 26. Additionally, the tuning of the bleed fluid flow through the bleed flow passages 100 can be controlled by controlling the size and number of bleed flow passages 100, the size and number of orifices 118, 126 in the restriction disc 102 and the orifice disc 104, respectively, and/or by controlling the thicknesses the restriction disc 102, the orifice disc 104, the fulcrum disc 106, and/or the check disc 108.

Alternative Embodiment of Restriction Disc Restriction Fingers

Referring now to FIGS. 7A, 7B, 7C, 7D, 7E, 7F, an alternative embodiment of a restriction disc 1102 is described. Restriction disc 1102 is a direct replacement for restriction disc 102. Although shown in cooperation with the piston body 60 described and shown herein, the restriction disc 1102 may be used with other types of piston bodies without departing from the scope of the invention. Thus, piston body 60 is not required to be used with the restriction disc 1102, and the restriction disc 1102 is not required to be used with the piston body 60.

The restriction disc 1102 includes a ring 112 having a center hole 114, and one or more fingers 116 extending radially outward from the ring 112, and one or more orifices 118 extending radially inward from the outer edge of each finger 116 of the restriction disc 1102. The restriction disc 1102 may be substantially the same as the restriction disc 102, except that the restriction disc 1102 further includes one or more restriction fingers 1116 extending radially outward from the ring 112. The restriction fingers 1116 have a length defined as a radius 1120 extending from the axis 35. In some embodiments, each restriction finger 1116 has the same radius 1120. In some embodiments, the radius 1120 of one or more restriction fingers 1116 may differ from the radius 1120 of one or more other restriction fingers 1116. Not all restriction fingers 1116 need to have the same radius 1120. The restriction fingers 1116 are configured to extend toward the inlets of one or more of the compression flow blowoff passages 96 or the rebound flow blowoff passages 98.

Where the radius 1120 of the restriction fingers 1116 is of a sufficient dimension, the restriction fingers 1116 may at least partially cover one or more of the inlets to the compression flow blowoff passages 96 or rebound flow blowoff passages 98. A larger radius 1120 will cover more of the underlying inlets to the compression flow blowoff passages 96 or rebound flow blowoff passages 98. Accordingly, a larger radius 1120 will increase the restriction on the flow of hydraulic fluid into the compression flow blowoff passages 96 or rebound flow blowoff passages 98.

Figure 7A:
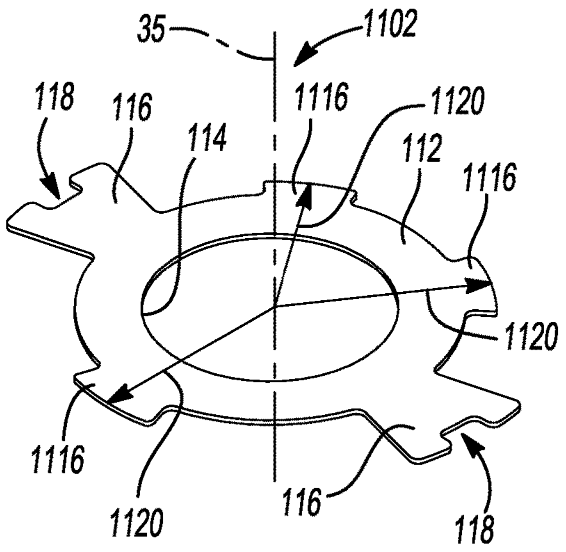
FIG. 7A is a perspective view of an exemplary restriction disc of the shock absorber in accordance with the teachings of the present disclosure.
Figure 7B:
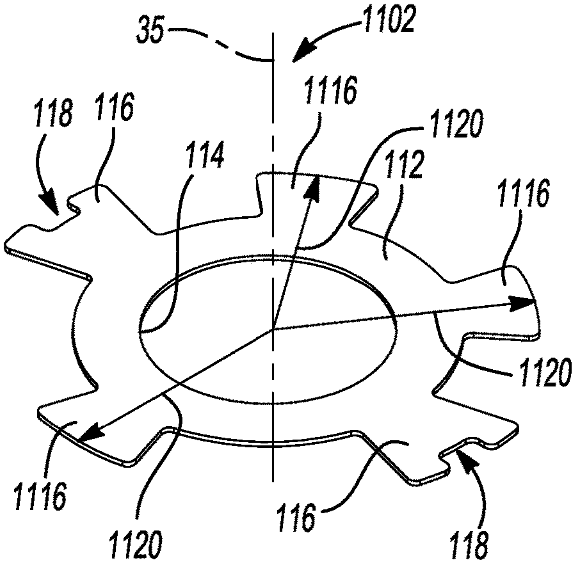
FIG. 7B is a perspective view of another exemplary restriction disc of the shock absorber in accordance with the teachings of the present disclosure.
Figure 7C:
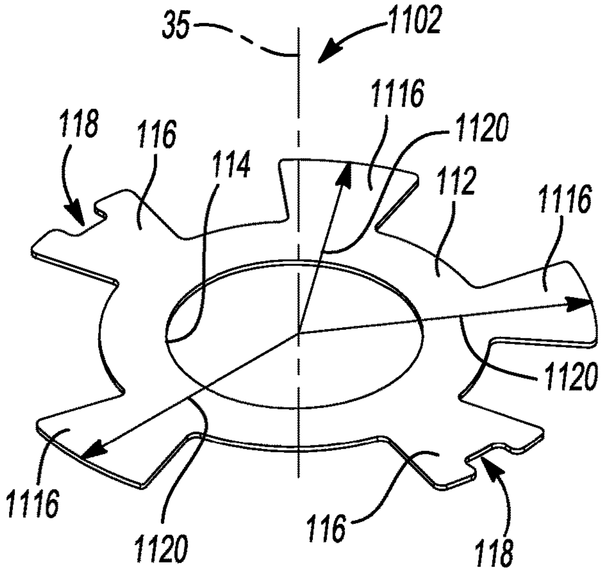
FIG. 7C is a perspective view of another exemplary restriction disc of the shock absorber in accordance with the teachings of the present disclosure.
Figure 7D:
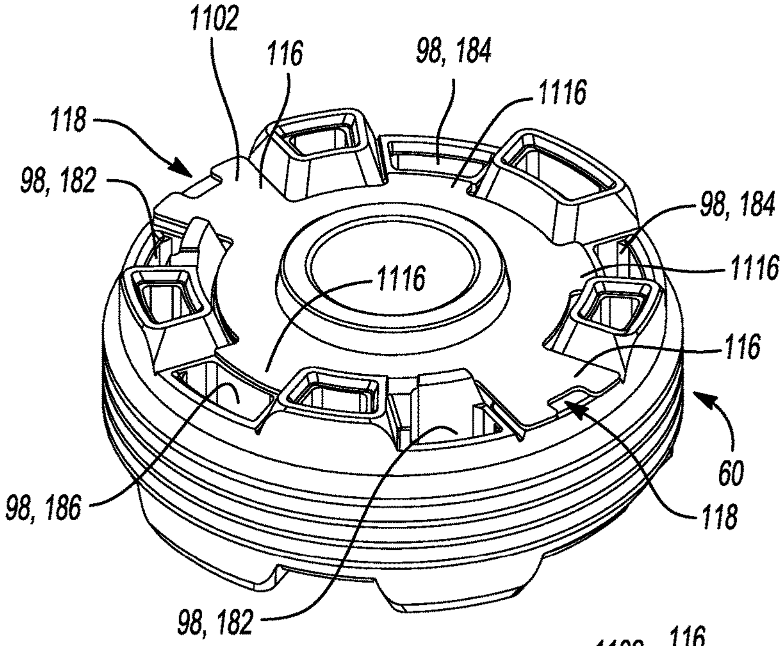
FIG. 7D is a perspective view of the exemplary restriction disc of FIG. 7A on an exemplary piston body.
Figure 7E:
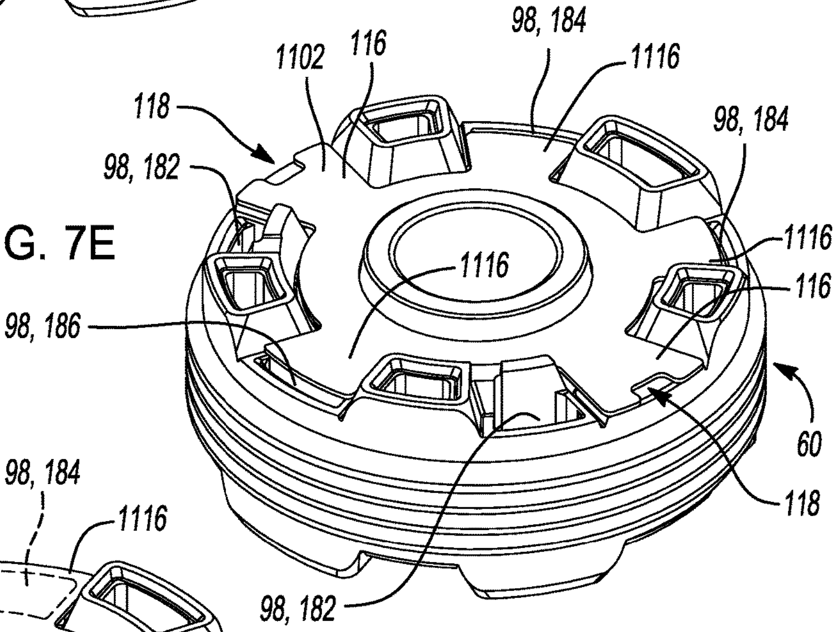
FIG. 7E is a perspective view of the exemplary restriction disc of FIG. 7B on an exemplary piston body.
Figure 7F:
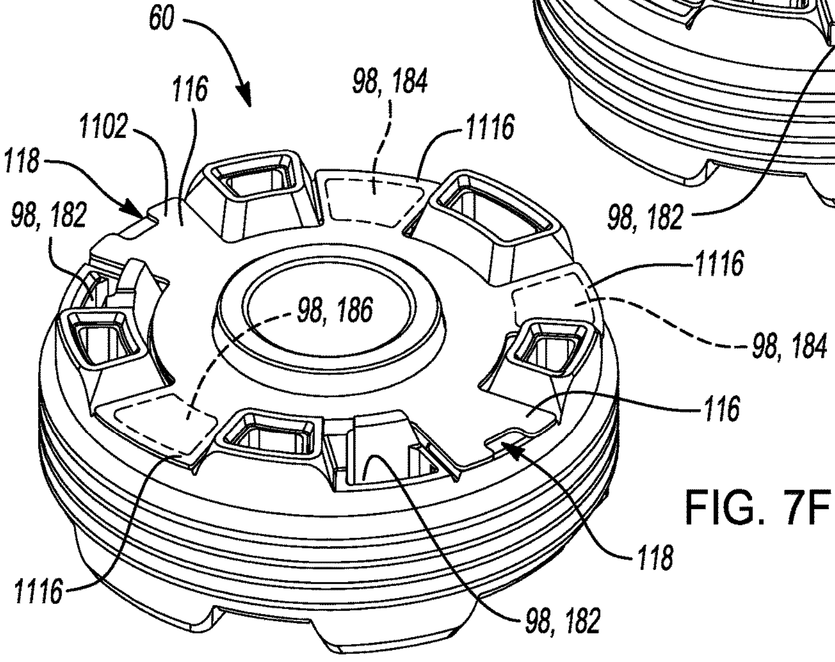
FIG. 7F is a perspective view of the exemplary restriction disc of FIG. 7C on an exemplary piston body.
Figure 11:
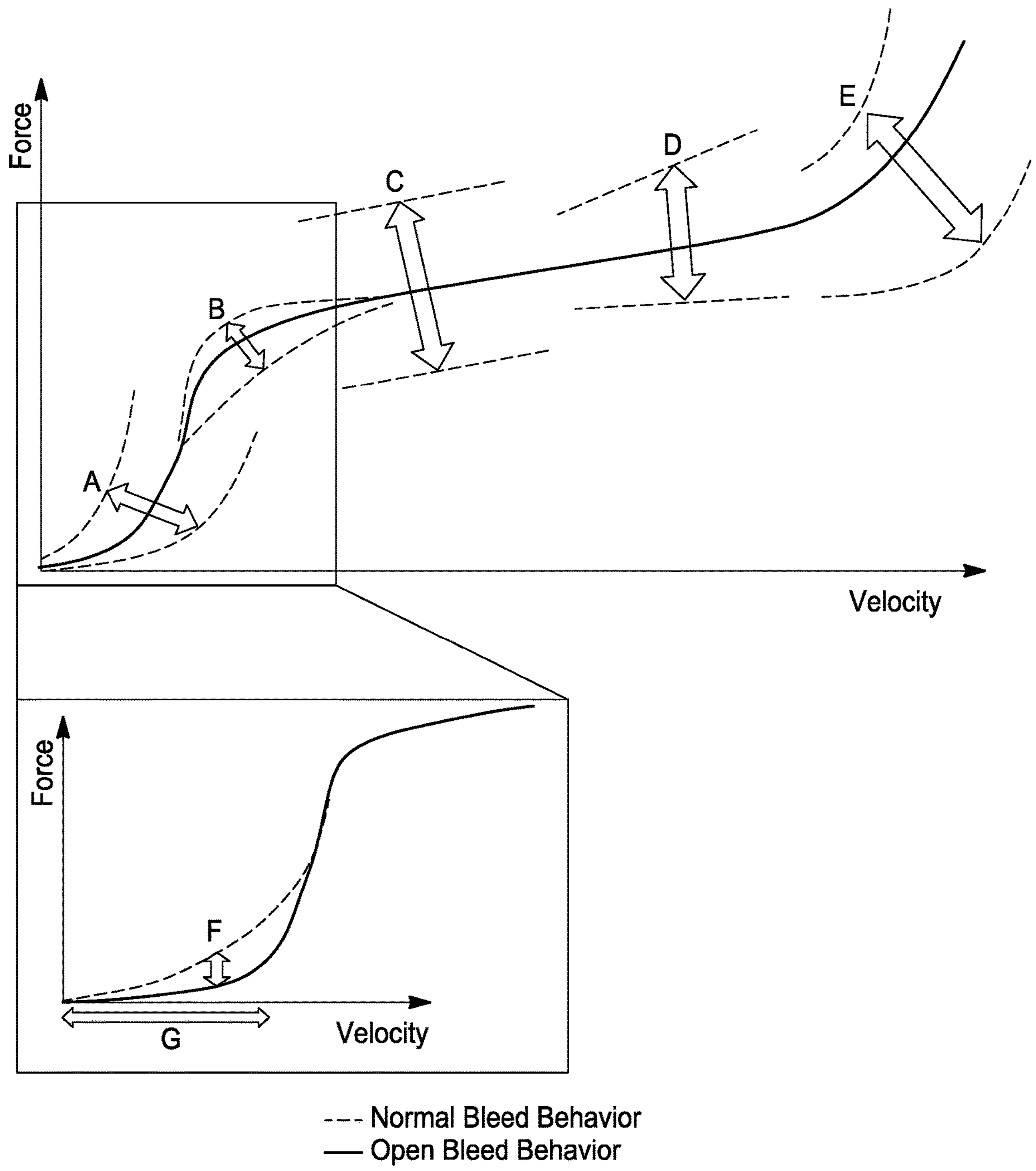
FIG. 11 is an illustration of the force response curve of the shock absorber moving toward the compressed position.

Depending on the radius 1120 of the restriction fingers 1116, the compression flow blowoff passages 96 or rebound flow blowoff passages 98 can be restricted from 0% to 100%. For example, as shown in FIG. 7D, the restriction disc 102 is on the first side 82 of the piston body 60 and the restriction fingers 1116 have a radius 1120 such that there is 0% restriction of the second rebound blowoff passages 184 and the third rebound blowoff passages 186 of the rebound flow blowoff passages 98. For example, as shown in FIG. 7E, the restriction disc 102 is on the first side 82 of the piston body 60 and the restriction fingers 1116 have a radius 1120 such that there is 50% restriction of the second rebound blowoff passages 184 and the third rebound blowoff passages 186 of the rebound flow blowoff passages 98. For example, as shown in FIG. 7F, the restriction disc 102 is on the first side 82 of the piston body 60 and the restriction fingers 1116 have a radius 1120 such that there is 100% restriction of the second rebound blowoff passages 184 and the third rebound blowoff passages 186 of the rebound flow blowoff passages 98. When there is 100% restriction, the hydraulic fluid is only able to pass through the piston body 60 via the bleed flow passages 100 and the first rebound blowoff passages 182 or first compression blowoff passages 176 of the piston body 60. While only the 0%, 50%, and 100% restriction conditions are shown, it will be understood that the radius 1120 of the restriction fingers 1116 can be selected to provide any percentage of restriction from 0% to 100%. As shown in FIG. 11, increasing the restriction percentage provided by the restriction fingers 1116 of the restriction disc 1102 increases the damping force at higher velocities, as shown in factor E of the force response curve of the shock absorber 20.

In some embodiments, the shock absorber 20 is provided as a kit wherein the kit has a plurality of restriction discs 1102, wherein each restriction disc 1102 is configured to cover a different percentage of the blowoff passages, such as for example compression flow blowoff passages 96 and rebound flow blowoff passages 98, to provide a different percent of restriction. The radial length or radius 1120 of the restriction fingers 1116 therefore differs between each restriction disc 1102 provided in the kit. For example, a first restriction disc 1102 in the kit may have one or more restriction fingers 1116 configured to cover 20% of the blowoff passages, a second restriction disc 1102 in the kit may have one or more restriction fingers 1116 configured to cover 40% of the blowoff passages, a third restriction disc 1102 in the kit may have one or more restriction fingers 1116 configured to cover 60% of the blowoff passages, a fourth restriction disc 1102 in the kit may have one or more restriction fingers 1116 configured to cover 80% of the blowoff passages, and a fifth restriction disc 1102 in the kit may have one or more restriction fingers 1116 configured to cover 100% of the blowoff passages. Accordingly, one of the restriction discs 1102 of the kit may be selected and included in the shock absorber 20 based on a desired damping response.

Radial Open Area and Axial Open Area

Figure 8:
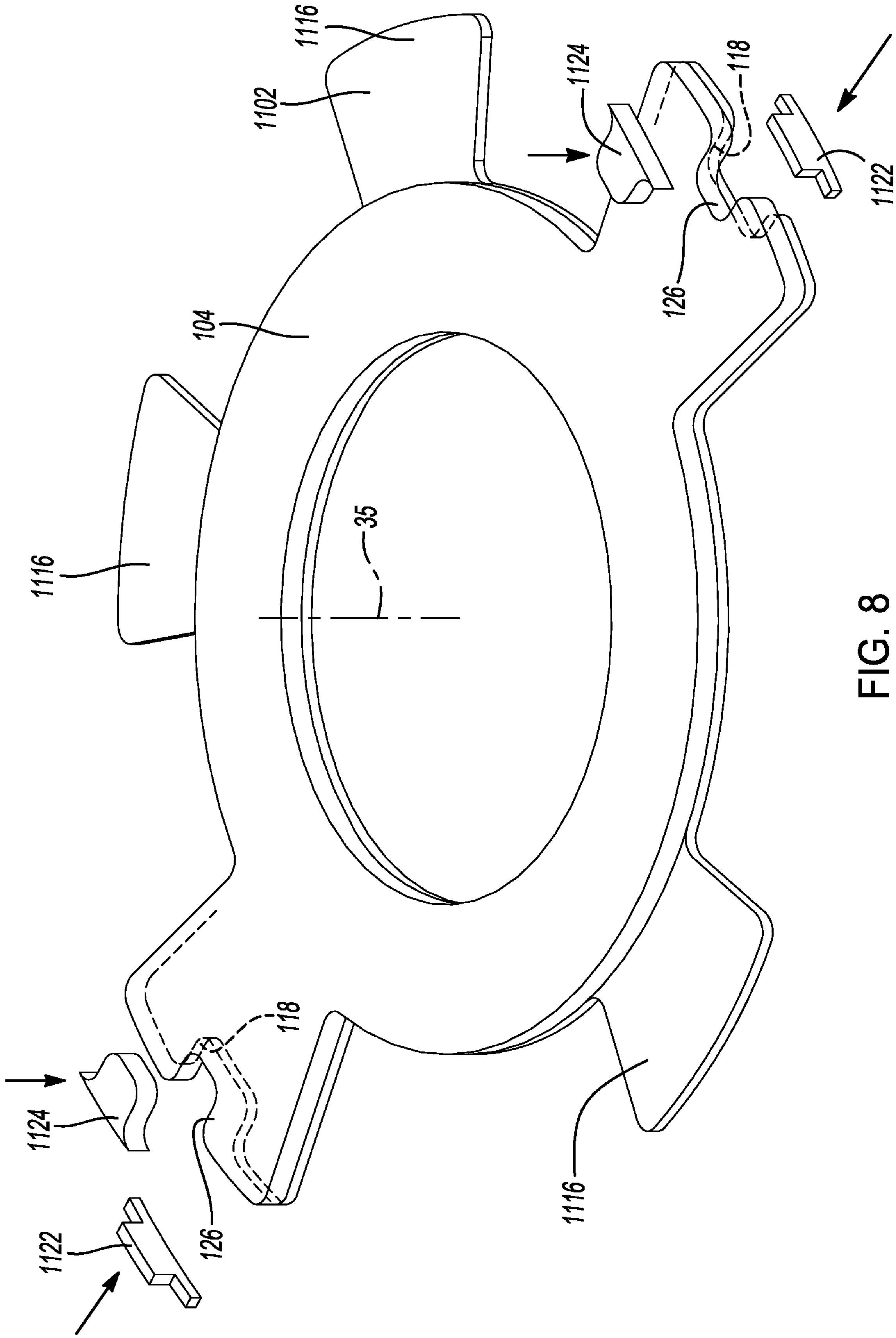
FIG. 8 is a perspective view of an exemplary orifice disc stacked on an exemplary restriction disc of the shock absorber.

Additional tuning capabilities of the restriction disc 1102 and the orifice disc 104 are described with reference to FIG. 8. As shown in FIG. 8, when the orifice disc 104 and the restriction disc 102 are stacked, the orifices 118 of the restriction disc 1102 and the orifices 126 of the orifice disc 104 cooperate to define a radial open area 1122 and an axial open area 1124. The elements called out with reference numerals 1122 and 1124 are not physical components of the restriction disc 1102 and the orifice disc 104 but represent the size and shape of the radial open area 1122 and the axial open area 1124.

The radial open area 1122 is defined by: (1) the width of the orifice 118 of the restriction disc 1102; (2) the width of the orifice 126 of the orifice disc 104; (3) the thickness of the restriction disc 1102; (4) and the thickness of the orifice disc 104. Therefore, radial open area 1122 may be modified by varying one or more of: (1) the width of the orifice 118 of the restriction disc 1102; (2) the width of the orifice 126 of the orifice disc 104; (3) the thickness of the restriction disc 1102; (4) and the thickness of the orifice disc 104. Varying the radial open area 1122 will vary factor A of the force response curve of the shock absorber 20 shown in FIGS. 10 and 11. By increasing the radial open area 1122, the normal bleed range is increased.

By providing the orifice disc 104 on top of the restriction disc 1102, each with an orifice 118, 126, respectively, the thickness factor increases, wherein the orifice disc 104 and the restriction disc 1102 have equal thickness the thickness factor is doubled. Additionally, by providing the orifice disc 104 on top of the restriction disc 1102, each with an orifice 118, 126, respectively, the ability to vary the radial open area is maximized.

With reference again to FIG. 8, the axial open area 1124 is defined by the smaller of: (1) the width of the orifice 118 of the restriction disc 1102; and (2) the width of the orifice 126 of the orifice disc 104. Therefore, the axial open area 1124 may be modified by varying the smallest one of: (1) the width of the orifice 118 of the restriction disc 1102; or (2) the width of the orifice 126 of the orifice disc 104. That is, the maximum axial open area 1124 is determined by the smallest orifice. In some embodiments, the width of the orifice 118 of the restriction disc 1102 is greater than the width of the orifice 126 of the orifice disc 104, such that the axial open area of the orifice 118 of the restriction disc 1102 is greater than the axial open area of the orifice 126 of the orifice disc 104.

Figure 10:
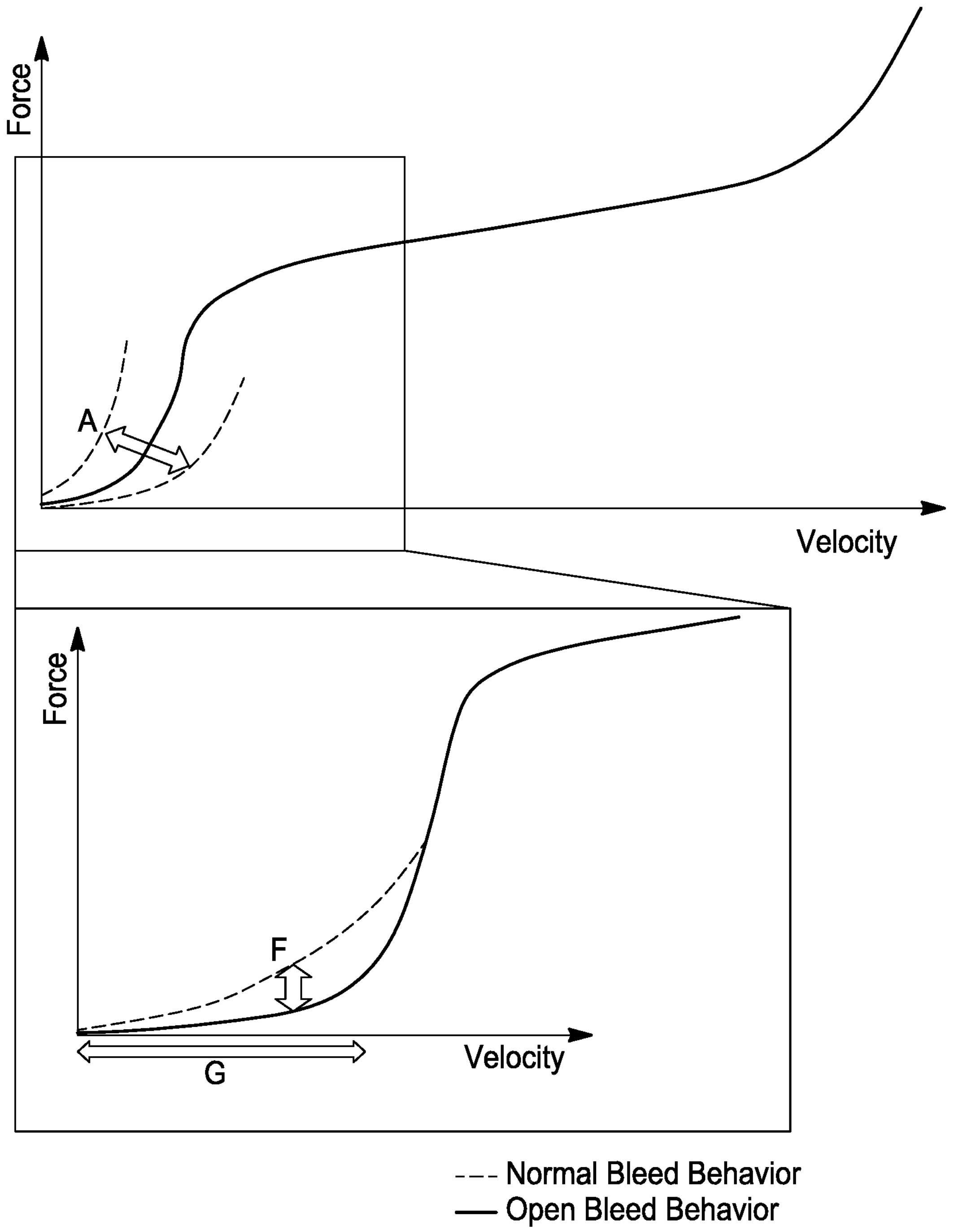
FIG. 10 is an illustration of the force response curve of the shock absorber moving toward the compressed position.

The axial open area 1124 along with the thickness of the fulcrum disc 106 impacts the drop (factor F of the force response curve of the shock absorber 20 shown in FIGS. 10 and 11) of the open bleed condition. By providing the orifice disc 104 on top of the restriction disc 1102, it is possible to vary the radial open area 1122 independently of the axial open area 1124. For example, it is possible to reduce the axial open area 1124 by providing an orifice disc 104 having an orifice 126 with a reduced width while maintaining a constant radial open area 1122 by providing a restriction disc 1102 having an orifice 118 with an increased width. The ability to independently vary the radial open area 1122 and the axial open area 1124 increases the tuneability of the open bleed feature.

In some embodiments, the width of the orifice 118 in each finger 116 of the restriction disc 1102 may be different. For example, the width of the orifice 118 in one finger 116 of the restriction disc 1102 may be less than the width of the orifice 118 in another finger 116 of the restriction disc 1102. This may provide yet another way to increase the tuneability of the bleed condition.

Likewise, in some embodiments, the width of the orifice 126 in each finger 124 of the orifice disc 104 may be different. For example, the width of the orifice 126 in one finger 124 of the orifice disc 104 may be less than the width of the orifice 126 in another finger 124 of the orifice disc 104. This may provide yet another way to increase the tuneability of the bleed condition.

In some embodiments, the shock absorber 20 is provided as a kit wherein the kit has a plurality of restriction discs 1102 and a plurality of orifice discs 104. The restriction discs 1102 in the kit may have different thicknesses, different orifice 118 widths, and different restriction finger 1116 radial lengths or radii 1120. Additionally, the orifice discs 104 in the kit may have different thicknesses and different orifice 118 widths. Accordingly, one of the restriction discs 1102 and one of the orifice discs 104 of the kit may be selected and included in the shock absorber 20 based on a desired damping response.

Although the restriction disc 1102 shown in FIG. 8 includes restriction fingers 1116, the restriction fingers 1116 are not required in every embodiment. For example, in some embodiments, one, some, or all of the restriction fingers 1116 may be omitted without eliminating the ability to tune the bleed condition by varying the radial open area 1122 and the axial open area 1124.

Alternative Embodiment—Fulcrum & Check Disc Diameter

Figure 9A:
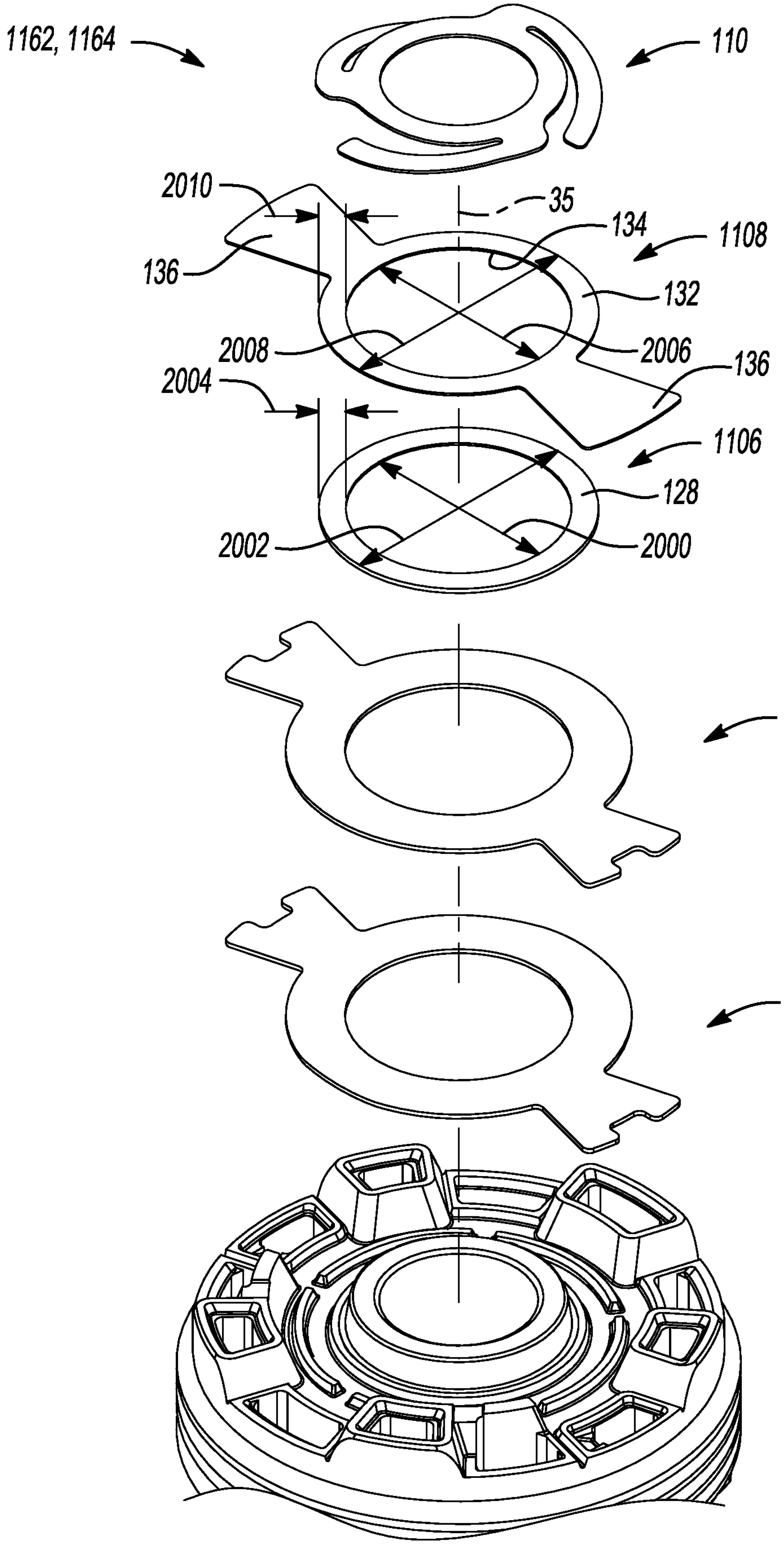
FIG. 9A is an exploded perspective view of an exemplary bleed valve assembly in accordance with the teachings of the present disclosure.
Figure 9B:
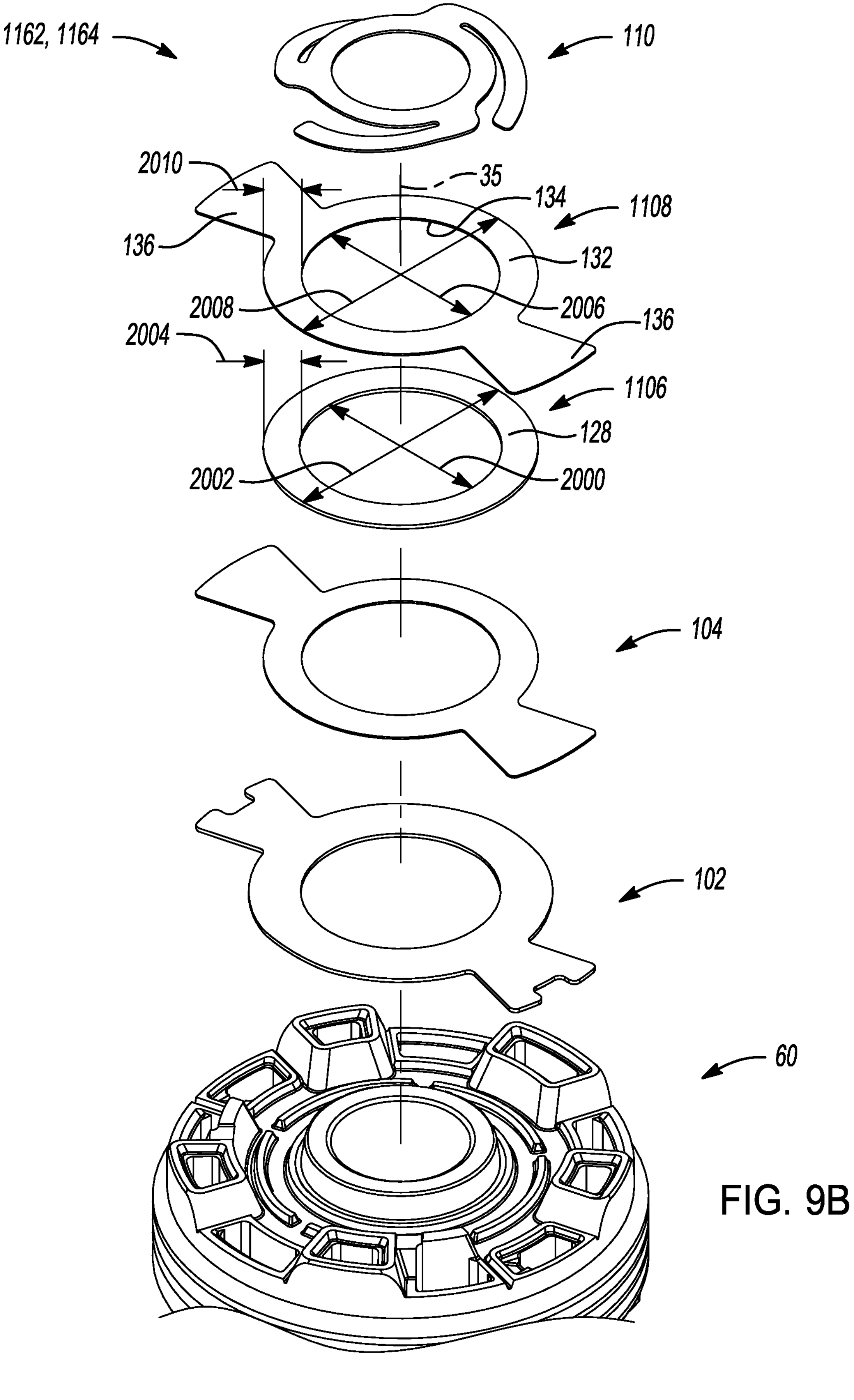
FIG. 9B is an exploded perspective view of an exemplary bleed valve assembly in accordance with the teachings of the present disclosure.

Referring now to FIGS. 9A and 9B, an alternative embodiment of a bleed valve assembly, such as for example the compression bleed valve assembly 1162 or the rebound bleed valve assembly 1164, includes a restriction disc 102, an orifice disc 104, a fulcrum disc 1106, and a check disc 1108. The fulcrum disc 1106 and the check disc 1108 are direct replacements for the fulcrum disc 106 and the check disc 108, respectively. Although shown in cooperation with the piston body 60 described and shown herein, the compression bleed valve assembly 1162 and/or rebound bleed valve assembly 1164 may be used with other types of piston bodies without departing from the scope of the invention. Thus, piston body 60 is not required to be used with the compression bleed valve assembly 1162 and/or rebound bleed valve assembly 1164, and the compression bleed valve assembly 1162 and/or rebound bleed valve assembly 1164 are not required to be used with the piston body 60.

The fulcrum disc 1106 comprises a ring 128 having a center hole 134. The ring 128 of the fulcrum disc 1106 has an inner diameter 2000 (defined by the center hole 130), an outer diameter 2002, and an annular width 2004 defined by the difference between the outer diameter 2002 and the inner diameter 2000. Additionally, the check disc 1108 comprises a ring 132 having a center hole 134. The ring 128 of the check disc 1108 has an inner diameter 2006 (defined by the center hole 134), an outer diameter 2008, and an annular width 2010 defined by the difference between the outer diameter 2008 and the inner diameter 2006. The outer diameters 2002, 2008 of the fulcrum disc 1106 and the check disc 1108 shown in FIG. 9A are less than the outer diameters 2002, 2008 of the fulcrum disc 1106 and the check disc 1108 shown in FIG. 9B. Additionally, the annular widths 2004, 2010 of the fulcrum disc 1106 and the check disc 1108 shown in FIG. 9A are less than the annular widths 2004, 2010 of the fulcrum disc 1106 and the check disc 1108 shown in FIG. 9B.

Typically, only the thickness of the fulcrum disc and check disc are changed to tune a bleed valve assembly. However, the fulcrum disc 1106 and the check disc 1108 provide increased tunability of the bleed valve assembly, such as for example compression bleed valve assembly 1162 or rebound bleed valve assembly 1164. The outer diameter 2002 of the fulcrum disc 1106 and the outer diameter 2008 of the check disc 1108 can be selected based on the desired damping response of the shock absorber 20. Varying the outer diameter 2002 of the fulcrum disc 1106 and the outer diameter 2008 of the check disc 1108 impacts the closing moment (factor G of the force response curve of the shock absorber 20 shown in FIGS. 10 and 11) of the check disc 1108. For example, increasing the outer diameter 2002 of the fulcrum disc 1106 and the outer diameter 2008 of the check disc 1108 effectively shortens the length of the fingers 136 of the check disc 1108. This reduces the moment arm of the fingers 136 and thus increases the force required to deflect the check disc 1108. As the outer diameter 2002 of the fulcrum disc 1106 and the outer diameter 2008 of the check disc 1108 increase, the check disc 1108 becomes stiffer.

Varying the outer diameter 2002 of the fulcrum disc 1106 and the outer diameter 2008 of the check disc 1108 may also impact the open bleed condition to the normal bleed condition curve (factor F of the force response curve of the shock absorber 20 shown in FIGS. 10 and 11).

In some embodiments, the outer diameter 2002 of the fulcrum disc 1106 is the same as the outer diameter 2008 of the check disc 1108. In some embodiments, the outer diameter 2002 of the fulcrum disc 1106 is different from the outer diameter 2008 of the check disc 1108. In some embodiments, the outer diameter 2002 of the fulcrum disc 1106 may be varied independently from the outer diameter 2008 of the check disc 1108.

In some embodiments, the shock absorber 20 is provided as a kit wherein the kit has a plurality of fulcrum discs 1106 and a plurality of check discs 1108. The fulcrum discs 1106 in the kit may have different outer diameters 2002. In some embodiments, the fulcrum discs 1106 in the kit may have different outer diameters 2002 and different thicknesses. Additionally, the check discs 1108 in the kit may have different outer diameters 2008. In some embodiments, the check discs 1108 in the kit may have different outer diameters 2008 and different thicknesses. Accordingly, one of the fulcrum discs 1106 and one of the check discs 1108 of the kit may be selected and included in the shock absorber 20 based on a desired damping response.

Now with reference to FIGS. 10 and 11, FIGS. 10 and 11 are graphs of force versus velocity (the force response curve) of shock absorbers moving toward the compressed position. The vertical or y-axis of the plot represents the force provided by the shock absorber 20 and the horizontal or x-axis of the plot represents the velocity of the piston rod 34. As described herein, varying the radial open area 1122 will vary factor A, varying the axial open area 1124 along with the thickness of the fulcrum disc 106 will vary factor F, varying the thickness of the fulcrum disc 106 and the check disc 108 will vary factor G. Additionally, increasing the restriction percentage provided by the restriction fingers 1116 of the restriction disc 1102 will vary factor E. Additionally, varying the thickness of the valve stop 154 will vary the factor C. Varying one or more of the outer diameter 2002 of the fulcrum disc 1106, the thickness of the fulcrum disc 1106, the outer diameter 2008 of the check disc 1108, and the thickness of the check disc 1108 may vary factors C, D, F, and G.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A kit for a shock absorber for a vehicle comprising:

a pressure tube defining a fluid chamber;

a piston configured to be disposed within the fluid chamber, the piston dividing the fluid chamber into an upper working chamber and a lower working chamber, wherein the piston defines a pair of bleed passages and a blow off passage that extend through the piston between the upper working chamber and the lower working chamber;

a first fulcrum disc, the first fulcrum disc having a ring, a first fulcrum disc inner diameter, and a first fulcrum disc outer diameter;

a first check disc, the first check disc having a ring, a first check disc inner diameter, a first check disc outer diameter, and one or more first cantilevered beams extending beyond the first check disc outer diameter, the one or more first cantilevered beams each having a free distal end;

a second fulcrum disc, the second fulcrum disc having a ring, a second fulcrum disc inner diameter, and a second fulcrum disc outer diameter, wherein the second fulcrum disc outer diameter is different from the first fulcrum disc outer diameter; and a second check disc, the second check disc having a ring, a second check disc inner diameter, a second check disc outer diameter, wherein the second check disc outer diameter is different from the first check disc outer diameter, and one or more second cantilevered beams extending beyond the second check disc outer diameter, the one or more second cantilevered beams each having a free distal end;

wherein the kit includes the first fulcrum disc, the first check disc, the second fulcrum disc, and the second check disc, and wherein during assembly of the shock absorber, only one of the first fulcrum disc and the second fulcrum disc and only one of the first check disc and the second check disc is selected and included in the shock absorber based on a desired damping response.

2. The kit of claim 1, wherein the desired damping response is a desired transition from an open bleed condition to a normal bleed condition.

3. The kit of claim 1, wherein:

the first fulcrum disc has a first fulcrum disc thickness;

the second fulcrum disc has a second fulcrum disc thickness, wherein the second fulcrum disc thickness is different from the first fulcrum disc thickness;

the first check disc has a first check disc thickness; and the second check disc has a second check disc thickness, wherein the second check disc thickness is different from the first check disc thickness.

4. A shock absorber for a vehicle comprising:

a pressure tube defining a fluid chamber;

a piston disposed within the fluid chamber, the piston dividing the fluid chamber into an upper working chamber and a lower working chamber, wherein the piston comprises a first side, a second side, and a fluid passage that extends through the piston between the upper working chamber and the lower working chamber; and a valve assembly comprising:

a restriction disc proximate to the first side of the piston, the restriction disc including:

a ring; and a finger extending radially outward from the ring, the finger configured to cover the fluid passage, the finger having a bleed orifice, wherein the bleed orifice remains open regardless of position of the restriction disc;

an orifice disc, wherein the restriction disc is between the orifice disc and the first side of the piston, the orifice disc including:

a ring; and a finger extending radially outward from the ring, having a bleed orifice, wherein the bleed orifice remains open regardless of position of the orifice disc, wherein the finger of the orifice disc overlaps the finger of the restriction disc, and wherein the bleed orifice of the orifice disc is aligned with the bleed orifice of the restriction disc;

a check disc including:

a ring; and a finger extending radially outward from the ring, the finger of the check disc is above the finger of the orifice disc; and a fulcrum disc, wherein the fulcrum disc is between the orifice disc and the check disc, the fulcrum disc including a ring.

5. The shock absorber of claim 4, wherein the ring of the check disc has an outer diameter and the ring of the fulcrum disc has an outer diameter.

6. The shock absorber of claim 5, wherein modifying the outer diameter of the ring of the check disc and the outer diameter of the ring of the fulcrum disc alters a damping response of the shock absorber.

7. The shock absorber of claim 5, wherein a damping response of the shock absorber is dependent on the outer diameter of the ring of the check disc and the outer diameter of the ring of the fulcrum disc.

8. The shock absorber of claim 5, wherein the outer diameter of the ring of the check disc is equal to the outer diameter of the ring of the fulcrum disc.

9. The shock absorber of claim 5, wherein the outer diameter of the ring of the check disc is different from the outer diameter of the ring of the fulcrum disc.

10. The shock absorber of claim 5, wherein the check disc is configured to selectively be in a first position and a second position, and wherein modifying the outer diameter of the ring of the check disc and the outer diameter of the ring of the fulcrum disc alters a force required to move the check disc from the first position to the second position.

11. The shock absorber of claim 10, wherein when the check disc is in the first position the finger of the check disc is above and separated a distance from the finger of the orifice disc, and wherein when the check disc is in the second position the finger of the check disc contacts the finger of the orifice disc.

12. The shock absorber of claim 4, wherein the fulcrum disc has a first thickness and the check disc has a second thickness, and wherein modifying the first thickness and the second thickness alters a damping response of the shock absorber.

13. The shock absorber of claim 4, wherein the fulcrum disc has a first thickness and the check disc has a second thickness, wherein the check disc is configured to selectively be in a first position and a second position, and wherein modifying the first thickness and the second thickness alters a force required to move the check disc from the first position to the second position.

14. The shock absorber of claim 4, further comprising a spring configured to push the check disc, fulcrum disc, orifice disc, and restriction disc against the piston.

15. The shock absorber of claim 14, wherein the spring comprises a ring and a plurality of arms extending circumferentially and radially outward from the ring, and wherein the plurality of arms are further bent at an angle with respect to a plane formed by the ring.

* * * * *